US006976243B2

(12) United States Patent
Charisius et al.

(10) Patent No.: US 6,976,243 B2
(45) Date of Patent: *Dec. 13, 2005

(54) METHOD AND SYSTEM FOR DEVELOPING SOURCE CODE AND DISPLAYING LINKED ELEMENTS FOUND WITHIN THE SOURCE CODE

(75) Inventors: Dietrich Charisius, Stuttgart (DE); Peter Coad, Raleigh, NC (US)

(73) Assignee: Borland Software Coporation, Cupertino, CA (US)

( * ) Notice: Subject to any disclaimer, the term of this patent is extended or adjusted under 35 U.S.C. 154(b) by 870 days.

This patent is subject to a terminal disclaimer.

(21) Appl. No.: 09/839,645

(22) Filed: Apr. 20, 2001

(65) Prior Publication Data

US 2002/0010909 A1 Jan. 24, 2002

Related U.S. Application Data

(63) Continuation-in-part of application No. 09/680,063, filed on Oct. 4, 2000, now Pat. No. 6,851,107.
(60) Provisional application No. 60/199,046, filed on Apr. 21, 2000, provisional application No. 60/157,826, filed on Oct. 5, 1999, and provisional application No. 60/199,046, filed on Apr. 21, 2000.

(51) Int. Cl.[7] ................................................ G06F 9/44
(52) U.S. Cl. ...................................................... 717/108
(58) Field of Search ................................ 717/108, 100; 345/427, 586, 656, 682, 761

(56) References Cited

U.S. PATENT DOCUMENTS

| 4,987,527 A | * | 1/1991 | Hamada et al. ............... 700/64 |
| 5,929,853 A | * | 7/1999 | Guha ........................... 345/764 |
| 6,014,145 A | * | 1/2000 | Bardon et al. ............... 345/427 |
| 6,078,329 A | * | 6/2000 | Umeki et al. ................ 345/419 |
| 6,188,405 B1 | * | 2/2001 | Czerwinski et al. ......... 345/764 |
| 6,535,232 B1 | * | 3/2003 | Tsuda et al. ................. 345/849 |

FOREIGN PATENT DOCUMENTS

| EP | 030 252 A1 | 8/2000 |
| EP | 1 030 242 A2 | 8/2000 |
| EP | 1 030 252 A1 | 8/2000 |

OTHER PUBLICATIONS

Visual Modeling with Rational Rose and UML, by Terry Quantrani. published Dec. 18, 1997, registered Mar. 10, 1998. pp. 1–220.*
IBM Technical Bulletin, Reducing the Latency of Distributed Resource Registration, May 1995, 2 pages.*
Unified Modeling Language (UML) UML Booch & OMT Quick Reference for Rational Rose 4.0.
Rational Rose Corporation, Rational Rose Release 4.0 (Nov. 1996) "Using Rational Rose 4.0" Chapters 3–11, pp. 11–207.
Object–Oriented Software Engineering, A Use Case Driven Approach 1996 Jacobson, Ivar Part I Chapters 1–5, Part II Chapters 6–12, Part III Chapters 13–16, pp. 1–500.
UML Distilled Applying the Standard Object Modeling Language 1997 Martin Fowler with Kendall Scott, Chapters 1–11, pp. 1–173.
James Martin, "Principles of Object–Oriented Analysis and Design," Prentice Hall, Oct. 29, 1992, Chapters 1–22.
M.M. Burnett, et al., "Visual Object–Oriented Programming Concepts and Environments,"Manning Publishing, 1994, Chapters 1–12.
Erich Gamma, et al., "Design Patterns Elements of Reusable Object–Oriented Software," Addison–Wesley, 1994, Chapter 1.
Wayne Citrin, et al., "A Formal Definition of Control Semantics in a Completely Visual Language," Sep. 1993, Mac World.
RR Software INC., "JANUS/ADA 95 Compiler User Manual," Version 5.1 Dec. 1995, pp. 6–1 to 6–48.
F. Penz, "Visual Programming in the ObjectWorld," Journal of Visual Languages and Computing, Mar. 1991, vol. 2, pp. 17–41.
L. Vanhelsuwe, "Mastering JAVABEANS," Sybex, Chapter 2.
David Withey McIntyre, "A Visual Method for Generating Iconic Programming Environments," UMI Dissertation Services.
Unified Modeling Language (UML) UML Booch & OMT Quick Reference for Rational Rose 4.0.
Rational Rose Corpporation, Rational Rose Release 4.0 (Nov. 1996) "Using Rational Rose 4.0" Chapters 3–11, pp.11–207.
Object–Oriented Software Engineering A Use Case Driven Approach 1996 Jacobson, Ivar Part I Chapters 1–5, Part II Chapters 6–12, Part III Chapters 13–16, pp. 1–500.
UML Distilled Applying the Standard Object Modeling Language 1997 Martin Fowler with Kendall Scott, Chapters 1–11, pp. 1–173.
James Martin, "Principles of Object–Oriented Analysis and Design," Prentice Hall, Oct. 29, 1992, Chapters 1–22.
M.M. Burnett, et al., "Visual Object–Oriented Programming Concepts and Environments," Manning Publishing, 1994, Chapters 1–12.
Erich Gamma, et al., "Design Patterns Elements of Reusable Object–Oriented Software," Addison–Wesley, 1994, Chapter 1.

(Continued)

*Primary Examiner*—Todd Ingberg
(74) *Attorney, Agent, or Firm*—MacCord Mason PLLC

(57) ABSTRACT

Methods and systems consistent with the present invention provide an improved software development tool that allows a developer to determine which elements in source code are at most a given number of links away from a selected element. Moreover, the software development tool allows the developer to specify the types of links connecting the elements from the selected element.

170 Claims, 29 Drawing Sheets

OTHER PUBLICATIONS

Wayne Citrin, et al., "A Formal Definition of Control Semantics in a Completely Visual Language," Sep. 1993, Mac World.

RR Software Inc., "Janus/ADA 95 Compiler User Manual," Version 5.1 Dec. 1995, pp. 6–1 to 6–48.

F. Penz, "Visual Programming in the Object World," Journal of Visual Languages and Computing, Mar. 1991, vol. 2, pp. 17–41.

L. Vanhelsuwe, "Mastering JAVABEANS," Sybex, Chapter 2.

David Withey McIntrye, "A Visual Method for Generating Iconic Programming Environments," UMI Dissertation Services.

* cited by examiner

METHOD AND SYSTEM FOR DEVELOPING SOURCE CODE AND DISPLAYING LINKED ELEMENTS FOUND WITHIN THE SOURCE CODE

CROSS-REFERENCE TO RELATED APPLICATIONS

This application claims the benefit of the filing date of U.S. Provisional Application No. 60/199,046, entitled "Software Development Tool," filed on Apr. 21, 2000, and is a continuation-in-part of U.S. Patent Application Ser. No. 09/680,063, entitled "Method and System for Developing Software," filed on Oct. 4, 2000 now U.S. Pat. No. 6,851,107, which claims the benefit of the filing date of U.S. Provisional Application No. 60/157,826, entitled "Visual Unified Modeling Language Development Tool," filed Oct. 5, 1999, and U.S. Provisional Application No. 60/199,046, entitled "Software Development Tool," filed on Apr. 21, 2000; all of which are incorporated herein by reference.

The following identified U.S. patent applications are also relied upon and are incorporated by reference in this application:

U.S. patent application Ser. No. 09/680,065, entitled "Method and System for Displaying Changes of Source Code," filed on Oct. 4, 2000;

U.S. patent application Ser. No. 09/680,030, entitled "Method and System for Generating, Applying, and Defining a Pattern," filed Oct. 4, 2000;

U.S. patent application Ser. No. 09/680,064, entitled "Method and System for Collapsing a Graphical Representation of Related Elements," filed on Oct. 4, 2000;

U.S. patent application Ser. No. 09/839,045, entitled "Method and Systems for Generating Source Code for Object Oriented Elements," and filed on the same date herewith;

U.S. patent application Ser. No. 09/839,526, entitled "Method and Systems for Relating Data Structures and Object Oriented Elements for Distributed Computing," and filed on the same date herewith;

U.S. patent application Ser. No. 09/839,525, entitled "Method and Systems for Finding Specific Line of Source Code," and filed on the same date herewith;

U.S. patent application Ser. No. 09/839,527, entitled "Method and Systems for Animating the Interaction of Objects in an Object Oriented Program," and filed on the same date herewith;

U.S. patent application Ser. No. 09/839,646, entitled "Methods and Systems for Supporting and Deploying Distributed Computing Components," and filed on the same date herewith;

U.S. patent application Ser. No. 09/838,580, entitled "Diagrammatic Control of a Software in a Version Control System," and filed on the same date herewith;

U.S. patent application Ser. No. 09/838,578, entitled "Navigation Links in Generated Documentation," and filed on the same date herewith;

U.S. patent application Ser. No. 09/839,644, entitled "Methods and Systems for Identifying Dependencies Between Object-Oriented Elements," and filed on the same date herewith; and U.S. patent application Ser. No. 09/839,524, entitled "Methods and Systems for Relating a Data Definition File and a Data Model for Distributed Computing," and filed on the same date herewith.

FIELD OF THE INVENTION

The present invention relates to a method and system for developing software. More particularly, the invention relates to a method and system for finding and displaying linked program elements.

BACKGROUND OF THE INVENTION

Computer instructions are written in source code. Although a skilled programmer can understand source code to determine what the code is designed to accomplish, with highly complex software systems, a graphical representation or model of the source code is helpful to organize and visualize the structure and components of the system. Using models, the complex systems are easily identified, and the structural and behavioral patterns can be visualized and documented.

The well-known Unified Modeling Language (UML) is a general-purpose notational language for visualizing, specifying, constructing, and documenting complex software systems. UML is used to model systems ranging from business information systems to Web-based distributed systems, to real-time embedded systems. UML formalizes the notion that real-world objects are best modeled as self-contained entities that contain both data and functionality. UML is more clearly described in the following references, which are incorporated herein by reference: (1) Martin Fowler, *UML Distilled Second Edition: Applying the Standard Object Modeling Language*, Addison-Wesley (1999); (2) Booch, Rumbaugh, and Jacobson, *The Unified Modeling Language User Guide*, Addison-Wesley (1998); (3) Peter Coad, Jeff DeLuca, and Eric Lefebvre, *Java Modeling in Color with UML: Enterprise Components and Process*, Prentice Hall (1999); and (4) Peter Coad, Mark Mayfield, and Jonathan Kern, *Java Design: Building Better Apps & Applets* (2nd Ed.), Prentice Hall (1998).

As shown in FIG. 1, conventional software development tools 100 allow a programmer to view UML 102 while viewing source code 104. The source code 104 is stored in a file, and a reverse engineering module 106 converts the source code 104 into a representation of the software project in a database or repository 108. The software project comprises source code 104 in at least one file which, when compiled, forms a sequence of instructions to be run by the data processing system. The repository 108 generates the UML 102. If any changes are made to the UML 102, they are automatically reflected in the repository 108, and a code generator 110 converts the representation in the repository 108 into source code 104. Such software development tools 100, however, do not synchronize the displays of the UML 102 and the source code 104. Rather, the repository 108 stores the representation of the software project while the file stores the source code 104. A modification in the UML 102 does not appear in the source code 104 unless the code generator 110 re-generates the source code 104 from the data in the repository 108. When this occurs, the portion of the source code 104 that is not protected from being overwritten is rewritten. Similarly, any modifications made to the source code 104 do not appear in the UML 102 unless the reverse engineering module 106 updates the repository 108. As a result, redundant information is stored in the repository 108 and the source code 104. In addition, rather than making incremental changes to the source code 104, conventional software development tools 100 rewrite the overall source code 104 when modifications are made to the UML 102, resulting in wasted processing time. This type of manual, large-grained synchronization requires either human intervention, or a "batch" style process to try to keep the two views (the UML 102 and the source code 104) in sync. Unfortunately, this approach, adopted by many tools, leads to many undesirable side-effects; such as desired changes to the source code being overwritten by the tool. A further disadvantage with conventional software development tools 100 is that they are designed to only work in a single programming language. Thus, a tool 100 that is designed for Java™ programs cannot be utilized to develop a program in C++. There is a need in the art for a tool that avoids the limitations of these conventional software development tools.

SUMMARY OF THE INVENTION

Methods and systems consistent with the present invention provide an improved software development tool that overcomes the limitations of conventional software development tools. The improved software development tool of the present invention allows a developer to simultaneously view a graphical and a textual display of source code. The graphical and textual views are synchronized so that a modification in one view is automatically reflected in the other view. In addition, the software development tool is designed for use with more than one programming language.

Due to the complexity of source code, a graphical representation of the source code may be difficult to analyze. Thus, the software development tool in accordance with methods consistent with the present invention assists the developer in analyzing the source code. In particular, the software development tool allows the developer to select an element in the source code, specify the types of links to other elements in the source code, and specify the number of links to the other elements. The software development tool then finds and displays the elements that are connected to the selected element by the types of links and that are connected to the selected element by at most the specified number of links.

In accordance with methods consistent with the present invention, a method is provided in a data processing system for developing source code having a plurality of elements. The method comprises the steps of converting the source code into a language-neutral representation, using the language-neutral representation to display a graphical representation of the plurality of elements, receiving a selection of one of the plurality of elements, receiving an indication of a distance, receiving an indication of a type of link, determining from the language-neutral representation which of the plurality of elements is connected to the selected element via a link of the indicated type and is within the indicated distance, and displaying the determined elements.

In accordance with methods consistent with the present invention, a method is provided in a data processing system for developing source code having a plurality of elements. The method comprises the steps of receiving a selection of one of the plurality of elements, receiving an indication of a distance, receiving an indication of a type of link, and determining which of the plurality of elements is connected to the selected element via a link of the indicated type and is within the indicated distance.

In accordance with methods consistent with the present invention, a method is provided in a data processing system for developing source code having a plurality of elements. The method comprises the steps of receiving a selection of one of the plurality of elements, receiving an indication of a distance, and determining which of the plurality of elements is within the indicated distance from the selected element.

In accordance with methods consistent with the present invention, a method is provided in a data processing system for developing source code having a plurality of elements. The method comprises the steps of receiving a selection of one of the plurality of elements, receiving an indication of a type of link, and determining which of the plurality of elements is connected to the selected element via a link of the indicated type.

In accordance with articles of manufacture consistent with the present invention, a computer-readable medium is provided. The computer-readable medium contains instructions for controlling a data processing system to perform a method. The data processing system has source code having a plurality of elements. The method comprises the steps of converting the source code into a language-neutral representation, using the language-neutral representation to display a graphical representation of the plurality of elements, receiving a selection of one of the plurality of elements, receiving an indication of a distance, receiving an indication of a type of link, determining from the language-neutral representation which of the plurality of elements is connected to the selected element via a link of the indicated type and is within the indicated distance, and displaying the determined elements.

In accordance with articles of manufacture consistent with the present invention, a computer-readable medium is provided. The computer-readable medium contains instructions for controlling a data processing system to perform a method. The data processing system has source code having a plurality of elements. The method comprises the steps of receiving a selection of one of the plurality of elements, receiving an indication of a distance, receiving an indication of a type of link, and determining which of the plurality of elements is connected to the selected element via a link of the indicated type and is within the indicated distance.

In accordance with articles of manufacture consistent with the present invention, a computer-readable medium is provided. The computer-readable medium contains instructions for controlling a data processing system to perform a method. The data processing system has source code having a plurality of elements. The method comprises the steps of receiving a selection of one of the plurality of elements, receiving an indication of a distance, and determining which of the plurality of elements is within the indicated distance from the selected element.

In accordance with articles of manufacture consistent with the present invention, a computer-readable medium is provided. The computer-readable medium contains instructions for controlling a data processing system to perform a method. The data processing system has source code having a plurality of elements. The method comprises the steps of receiving a selection of one of the plurality of elements, receiving an indication of a type of link, and determining which of the plurality of elements is connected to the selected element via a link of the indicated type.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION OF THE INVENTION

Methods and systems consistent with the present invention provide an improved software development tool that creates a graphical representation of source code regardless of the programming language in which the code is written. In addition, the software development tool simultaneously reflects any modifications to the source code to both the display of the graphical representation as well as the textual display of the source code.

Figure 1:
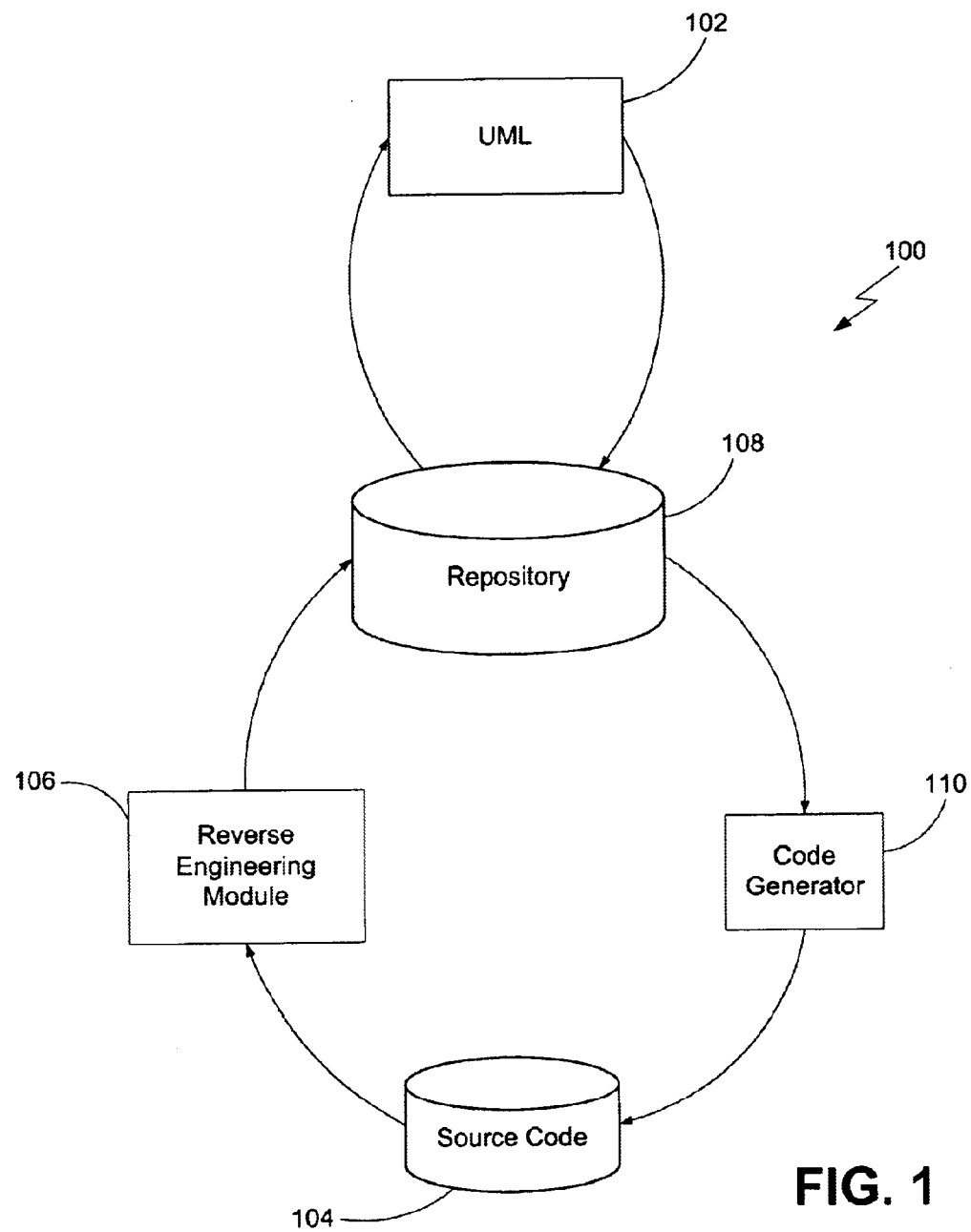
FIG. 1 depicts a conventional software development tool.
Figure 2:
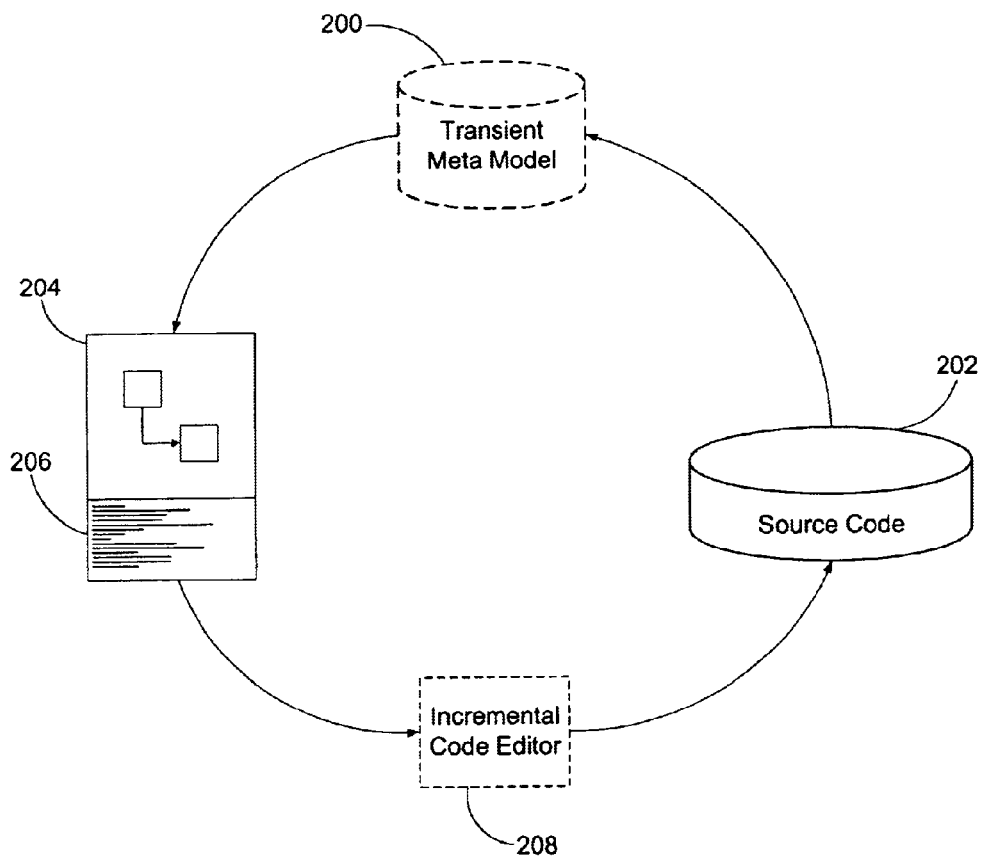
FIG. 2 depicts an overview of a software development tool in accordance with methods and systems consistent with the present invention.

As depicted in FIG. 2, source code 202 is being displayed in both a graphical form 204 and a textual form 206. In accordance with methods and systems consistent with the present invention, the improved software development tool generates a transient meta model (TMM) 200 which stores a language-neutral representation of the source code 202. The graphical 204 and textual 206 representations of the source code 202 are generated from the language-neutral representation in the TMM 200. Alternatively, the textual view 206 of the source code may be obtained directly from the source code file. Although modifications made on the displays 204 and 206 may appear to modify the displays 204 and 206, in actuality all modifications are made directly to the source code 202 via an incremental code editor (ICE) 208, and the TMM 200 is used to generate the modifications in both the graphical 204 and the textual 206 views from the modifications to the source code 202.

The improved software development tool provides simultaneous round-trip engineering, i.e., the graphical representation 204 is synchronized with the textual representation 206. Thus, if a change is made to the source code 202 via the graphical representation 204, the textual representation 206 is updated automatically. Similarly, if a change is made to the source code 202 via the textual representation 206, the graphical representation 204 is updated to remain synchronized. There is no repository, no batch code generation, and no risk of losing code.

Figure 3:
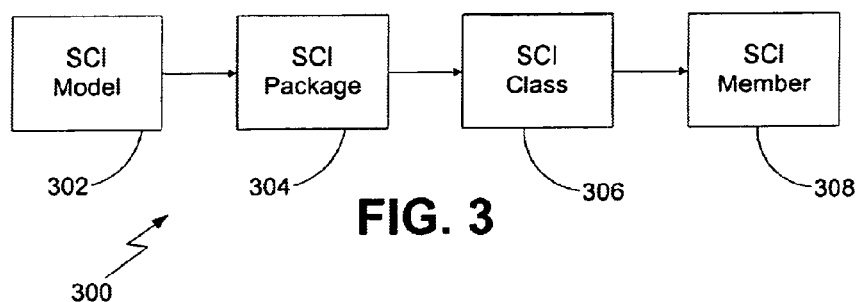
FIG. 3 depicts a data structure of the language-neutral representation created by the software development tool of FIG. 2.

The data structure 300 of the language-neutral representation is depicted in FIG. 3. The data structure 300 comprises a Source Code Interface (SCI) model 302, an SCI package 304, an SCI class 306, and an SCI member 308. The SCI model 302 is the source code organized into packages. The SCI model 302 corresponds to a directory for a software project being developed by the user, and the SCI package 304 corresponds to a subdirectory. The software project comprises the source code in at least one file that is compiled to form a sequence of instructions to be run by a data processing system. The data processing system is discussed in detail below. As is well known in object-oriented programming, the class 306 is a category of objects which describes a group of objects with similar properties (attributes), common behavior (operations or methods), common relationships to other objects, and common semantics. The members 308 comprise attributes and/or operations.

Figure 4:
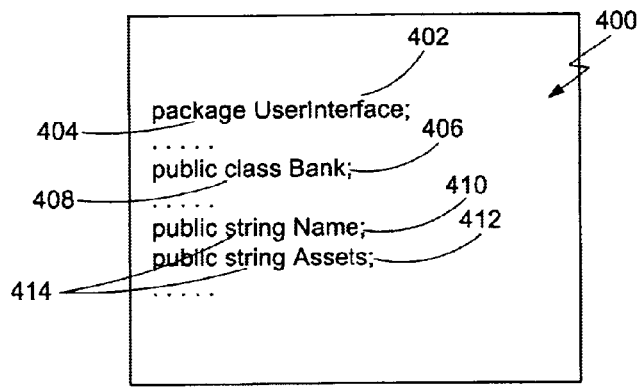
FIG. 4 depicts representative source code.
Figure 5:
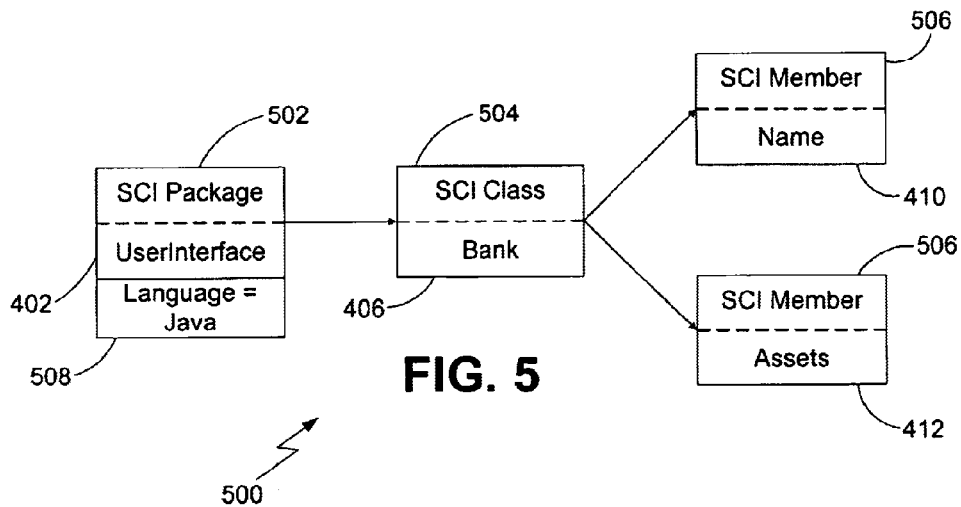
FIG. 5 depicts the data structure of the language-neutral representation of the source code of FIG. 4.

For example, the data structure 500 for the source code 400 depicted in FIG. 4 is depicted in FIG. 5. UserInterface 402 is defined as a package 404. Accordingly, UserInterface 402 is contained in SCI package 502. Similarly, Bank 406, which is defined as a class 408, is contained in SCI class 504, and Name 410 and Assets 412, which are defined as attributes (strings 414), are contained in SCI members 506. Since these elements are in the same project, all are linked. The data structure 500 also identifies the language in which the source code is written 508, e.g., the Java™ language.

Figure 6:
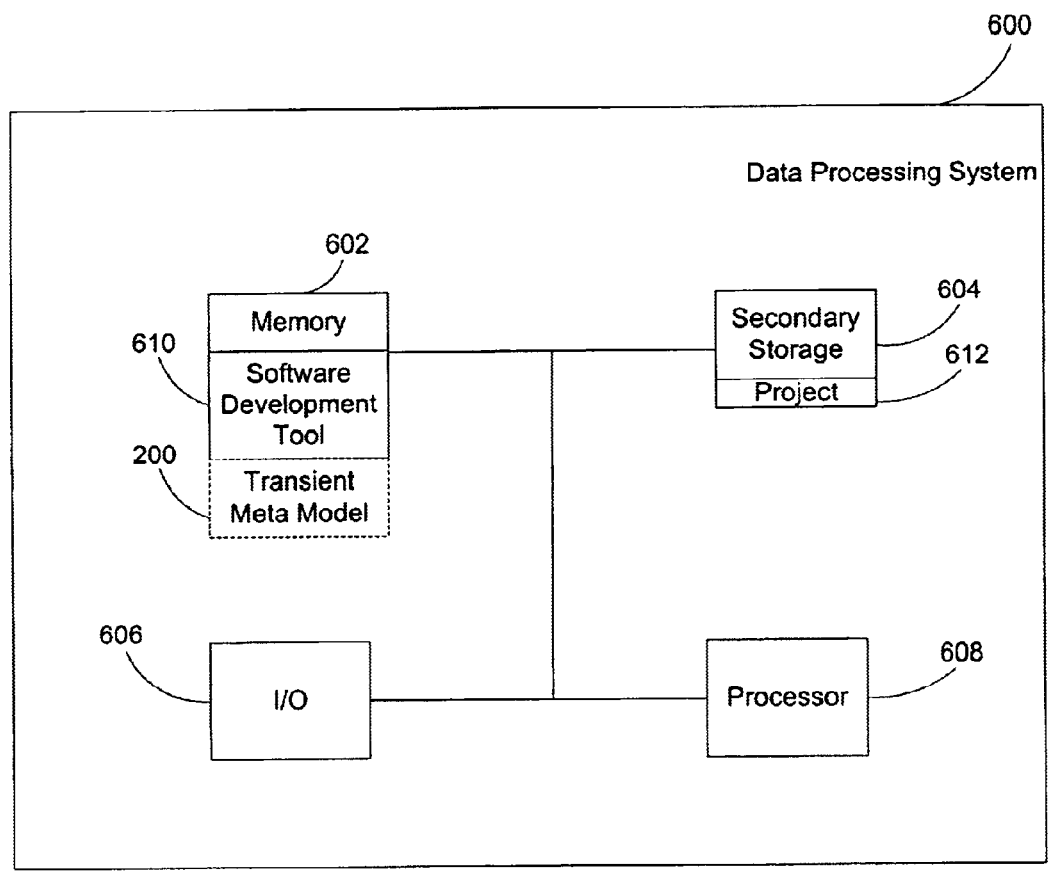
FIG. 6 depicts a data processing system suitable for practicing the present invention.

FIG. 6 depicts a data processing system 600 suitable for practicing methods and systems consistent with the present invention. Data processing system 600 comprises a memory 602, a secondary storage device 604, an I/O device 606, and a processor 608. Memory 602 includes the improved software development tool 610. The software development tool 610 is used to develop a software project 612, and create the TMM 200 in the memory 602. The project 612 is stored in the secondary storage device 604 of the data processing system 600. One skilled in the art will recognize that data processing system 600 may contain additional or different components.

Although aspects of the present invention are described as being stored in memory, one skilled in the art will appreciate that these aspects can also be stored on or read from other types of computer-readable media, such as secondary storage devices, like hard disks, floppy disks or CD-ROM; a carrier wave from a network, such as Internet; or other forms of RAM or ROM either currently known or later developed.

Figure 7:
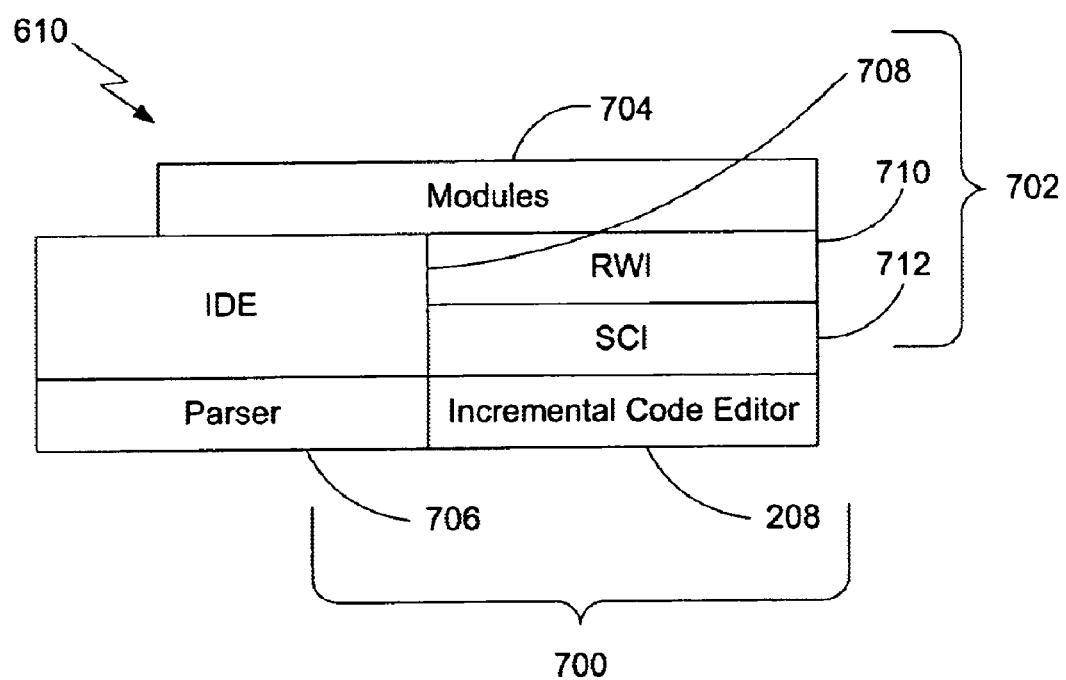
FIG. 7 depicts an architectural overview of the software development tool of FIG. 2.

FIG. 7 illustrates an architectural overview of the improved software development tool 610. The tool 610 comprises a core 700, an open application program interface (API) 702, and modules 704. The core 700 includes a parser 706 and an ICE 208. The parser 706 converts the source code into the language-neutral representation in the TMM, and the ICE 208 converts the text from the displays into source code. There are three main packages composing the API 702: Integrated Development Environment (IDE) 708; Read-Write Interface (RWI) 710; and Source Code Interface (SCI) 712. Each package includes corresponding subpackages. As is well known in the art, a package is a collection of classes, interfaces, attributes, notifications, operations, or behaviors that are treated as a single module or program unit.

IDE 708 is the API 702 needed to generate custom outputs based on information contained in a model. It is a read-only interface, i.e., the user can extract information from the model, but not change the model. IDE 708 provides the functionality related to the model's representation in IDE 708 and interaction with the user. Each package composing the IDE group has a description highlighting the areas of applicability of this concrete package.

RWI 710 enables the user to go deeper into the architecture. Using RWI 710, information can be extracted from and written to the models. RWI not only represents packages, classes and members, but it may also represent different diagrams (class diagrams, use case diagrams, sequence diagrams and others), links, notes, use cases, actors, states, etc.

SCI 712 is at the source code level, and allows the user to work with the source code almost independently of the language being used.

There are a variety of modules 704 in the software development tool 610 of the present invention. Some of the modules 704 access information to generate graphical and code documentation in custom formats, export to different file formats, or develop patterns. The software development tool also includes a quality assurance (QA) module which monitors the modifications to the source code and calculates various complexity metrics, i.e., various measurements of the program's performance or efficiency, to support quality assurance. The types of metrics calculated by the software development tool include basic metrics, cohesion metrics, complexity metrics, coupling metrics, Halstead metrics, inheritance metrics, maximum metrics, polymorphism metrics, and ratio metrics. Examples of these metrics with their respective definitions are identified in Tables 1–9 below.

TABLE 1

Basic Metrics

| Basic Metrics | Description |
| --- | --- |
| Lines Of Code | Counts the number of code lines. |
| Number Of Attributes | Counts the number of attributes. If a class has a high number of attributes, it may be appropriate to divide it into subclasses. |
| Number Of Classes | Counts the number of classes. |
| Number Of Import Statements | Counts the number of imported packages/classes. This measure can highlight excessive importing, and also can be used as a measure of coupling. |
| Number Of Members | Counts the number of members, i.e., attributes and operations. If a class has a high number of members, it may be appropriate to divide it into subclasses. |
| Number Of Operations | Counts the number of operations. If a class has a high number of operations, it may be appropriate to divide it into subclasses. |

TABLE 2

Cohesion Metrics

| Cohesion Metrics | Description |
| --- | --- |
| Lack Of Cohesion Of Methods 1 | Takes each pair of methods in the class and determines the set of fields they each access. A low value indicates high coupling between methods, which indicates potentially low reusability and increased testing because many methods can affect the same attributes. |
| Lack Of Cohesion Of Methods 2 | Counts the percentage of methods that do not access a specific attribute averaged over all attributes in the class. A high value of cohesion (a low lack of cohesion) implies that the class is well designed. |
| Lack Of Cohesion Of Methods 3 | Measures the dissimilarity of methods in a class by attributes. A low value indicates good class subdivision, implying simplicity and high reusability. A high lack of cohesion increases complexity, thereby increasing the likelihood of errors during the development process. |

TABLE 3

Complexity Metrics

| Complexity Metrics | Description |
|---|---|
| Attribute Complexity | Defined as the sum of each attribute's value in the class. |
| Cyclomatic Complexity | Represents the cognitive complexity of the class. It counts the number of possible paths through an algorithm by counting the number of distinct regions on a flowgraph, i.e., the number of 'if,' 'for'and 'while' statements in the operation's body. |
| Number Of Remote Methods | Processes all of the methods and constructors, and counts the number of different remote methods called. A remote method is defined as a method which is not declared in either the class itself or its ancestors. |
| Response For Class | Calculated as 'Number of Local Methods' + 'Number of Remote Methods.' A class which provides a larger response set is considered to be more complex and requires more testing than one with a smaller overall design complexity. |
| Weighted Methods Per Class 1 | The sum of the complexity of all methods for a class, where each method is weighted by its cyclomatic complexity. The number of methods and the complexity of the methods involved is a predictor of how much time and effort is required to develop and maintain the class. |
| Weighted Methods Per Class 2 | Measures the complexity of a class, assuming that a class with more methods than another is more complex, and that a method with more parameters than another is also likely to be more complex. |

TABLE 4

Coupling Metrics

| Coupling Metrics | Description |
|---|---|
| Coupling Between Objects | Represents the number of other classes to which a class is coupled. Counts the number of reference types that are used in attribute declarations, formal parameters, return types, throws declarations and local variables, and types from which attribute and method selections are made. Excessive coupling between objects is detrimental to modular design and prevents reuse. The more independent a class is, the easier it is to reuse it in another application. In order to improve modularity and promote encapsulation, inter-object class couples should be kept to a minimum. The larger the number of couples, the higher the sensitivity to changes in other parts of the design, and therefore maintenance is more difficult. A measure of coupling is useful to determine how complex the testing of various parts of a design is likely to be. The higher the inter-object class coupling, the more rigorous the testing needs to be. |
| Data Abstraction Coupling | Counts the number of reference types used in the attribute declarations. |
| FanOut | Counts the number of reference types that are used in attribute declarations, formal parameters, return types, throws declarations and local variables. |

TABLE 5

Halstead Metrics

| Halstead Metrics | Description |
|---|---|
| Halstead Difficulty | This measure is one of the Halstead Software Science metrics. It is calculated as ('Number of Unique Operators'/'Number of Unique Operands') * ('Number of Operands'/'Number of Unique Operands'). |
| Halstead Effort | This measure is one of the Halstead Software Science metrics. It is calculated as 'Halstead Difficulty' * 'Halstead Program Volume.' |
| Halstead Program Length | This measure is one of the Halstead Software Science metrics. It is calculated as 'Number of Operators' + 'Number of Operands.' |
| Halstead Program Vocabulary | This measure is one of the Halstead Software Science metrics. It is calculated as 'Number of Unique Operators' + 'Number of Unique Operands.' |
| Halstead Program Volume | This measure is one of the Halstead Software Science metrics. It is calculated as 'Halstead Program Length' * $\text{Log}_2$ ('Halstead Program Vocabulary'). |
| Number Of Operands | This measure is used as an input to the Halstead Software Science metrics. It counts the number of operands used in a class. |
| Number Of Operators | This measure is used as an input to the Halstead Software Science metrics. It counts the number of operators used in a class. |
| Number Of Unique Operands | This measure is used as an input to the Halstead Software Science metrics. It counts the number of unique operands used in a class. |
| Number Of Unique Operators | This measure is used as an input to the Halstead Software Science metrics. It counts the number of unique operators used in a class. |

TABLE 6

Inheritance Metrics

| Inheritance Metrics | Description |
|---|---|
| Depth Of Inheritance Hierarchy | Counts how far down the inheritance hierarchy a class or interface is declared. High values imply that a class is quite specialized. |
| Number Of Child Classes | Counts the number of classes which inherit from a particular class, i.e., the number of classes in the inheritance tree down from a class. Non-zero value indicates that the particular class is being re-used. The abstraction of the class may be poor if there are too many child classes. It should also be stated that a high value of this measure points to the definite amount of testing required for each child class. |

TABLE 7

Maximum Metrics

| Maximum Metrics | Description |
|---|---|
| Maximum Number Of Levels | Counts the maximum depth of 'if,' 'for' and 'while' branches in the bodies of methods. Logical units with a large number of nested levels may need implementation simplification and process improvement because groups that contain more than seven pieces of information are increasingly harder for people to understand in problem solving. |
| Maximum Number Of Parameters | Displays the maximum number of parameters among all class operations. Methods with many parameters tend to be more specialized and, thus, are less likely to be reusable. |

TABLE 7-continued

Maximum Metrics

| Maximum Metrics | Description |
| --- | --- |
| Maximum Size Of Operation | Counts the maximum size of the operations for a class. Method size is determined in terms of cyclomatic complexity, i.e., the number of 'if,' 'for' and 'while' statements in the operation's body. |

TABLE 8

Polymorphism Metrics

| Polymorphism Metrics | Description |
| --- | --- |
| Number Of Added Methods | Counts the number of operations added by a class. A large value of this measure indicates that the functionality of the given class becomes increasingly distinct from that of the parent classes. In this case, it should be considered whether this class genuinely should be inheriting from the parent, or if it could be broken down into several smaller classes. |
| Number Of Overridden Methods | Counts the number of inherited operations which a class overrides. Classes without parents are not processed. High values tend to indicate design problems, i.e., subclasses should generally add to and extend the functionality of the parent classes rather than overriding them. |

TABLE 9

Ratio Metrics

| Ratio Metrics | Description |
| --- | --- |
| Comment Ratio | Counts the ratio of comments to total lines of code including comments. |
| Percentage Of Package Members | Counts the percentage of package members in a class. |
| Percentage Of Private Members | Counts the percentage of private members in a class. |
| Percentage Of Protected Members | Counts the percentage of protected members in a class. |
| Percentage Of Public Members | Counts the proportion of vulnerable members in a class. A large proportion of such members means that the class has high potential to be affected by external classes and means that increased efforts will be needed to test such a class thoroughly. |
| True Comment Ratio | Counts the ratio of comments to total lines of code excluding comments. |

The QA module also provides audits, i.e., the module checks for conformance to predefined or user-defined styles. The types of audits provided by the module include coding style, critical errors, declaration style, documentation, naming style, performance, possible errors and superfluous content. Examples of these audits with their respective definitions are identified in Tables 10–17 below.

TABLE 10

Coding Style Audits

| Coding Style Audits | Description |
| --- | --- |
| Access Of Static Members Through Objects | Static members should be referenced through class names rather than through objects. |
| Assignment To Formal Parameters | Formal parameters should not be assigned. |
| Complex Assignment | Checks for the occurrence of multiple assignments and assignments to variables within the same expression. Complex assignments should be avoided since they decrease program readability. |
| Don't Use the Negation Operator Frequently | The negation operator slows down the readability of the program. Thus, it is recommended that it not be used frequently. |
| Operator '?:' May Not Be Used | The operator '?:' makes the code harder to read than the alternative form with an if-statement. |
| Provide Incremental In For-Statement or use while-statement | Checks if the third argument of the 'for'-statement is missing. |
| Replacement For Demand Imports | Demand import-declarations must be replaced by a list of single import-declarations that are actually imported into the compilation unit. In other words, import-statements may not end with an asterisk. |
| Use Abbreviated Assignment Operator | Use the abbreviated assignment operator in order to write programs more rapidly. Also some compilers run faster with the abbreviated assignment operator. |
| Use 'this' Explicitly To Access Class Members | Tries to make the developer use 'this' explicitly when trying to access class members. Using the same class member names with parameter names often makes what the developer is referring to unclear. |

TABLE 11

Critical Errors Audits

| Critical Errors Audits | Description |
| --- | --- |
| Avoid Hiding Inherited Attributes | Detects when attributes declared in child classes hide inherited attributes. |
| Avoid Hiding Inherited Static Methods | Detects when inherited static operations are hidden by child classes. |
| Command Query Separation | Prevents methods that return a value from a modifying state. The methods used to query the state of an object must be different from the methods used to perform commands (change the state of the object). |
| Hiding Of Names | Declarations of names should not hide other declarations of the same name. |
| Inaccessible Constructor Or Method Matches | Overload resolution only considers constructors and methods that are visible at the point of the call. If, however, all the constructors and methods were considered, there may be more matches. This rule is violated in this case. Imagine that ClassB is in a different package than ClassA. Then the allocation of ClassB violates this rule since the second constructor is not visible at the point of the allocation, but it still matches the allocation (based on signature). Also the call to open in ClassB violates this rule since the second and the third declarations of open are not visible at the point of the call, but it still matches the call (based on signature). |
| Multiple Visible Declarations With Same Name | Multiple declarations with the same name must not be simultaneously visible except for overloaded methods. |
| Overriding a Non-Abstract Method With an Abstract Method | Checks for abstract methods overriding non-abstract methods in a subclass. |

TABLE 11-continued

Critical Errors Audits

| Critical Errors Audits | Description |
|---|---|
| Overriding a Private Method | A subclass should not contain a method with the same name and signature as in a superclass if these methods are declared to be private. |
| Overloading Within a Subclass | A superclass method may not be overloaded within a subclass unless all overloading in the superclass are also overridden in the subclass. It is very unusual for a subclass to be overloading methods in its superclass without also overriding the methods it is overloading. More frequently this happens due to inconsistent changes between the superclass and subclass - i.e., the intention of the user is to override the method in the superclass, but due to the error, the subclass method ends up overloading the superclass method. |
| Use of Static Attribute for Initialization | Non-final static attributes should not be used in initializations of attributes. |

TABLE 12

Declaration Style Audits

| Declaration Style Audits | Description |
|---|---|
| Badly Located Array Declarators | Array declarators must be placed next to the type descriptor of their component type. |
| Constant Private Attributes Must Be Final | Private attributes that never get their values changed must be declared final. By explicitly declaring them in such a way, a reader of the source code get some information of how the attribute is supposed to be used. |
| Constant Variables Must Be Final | Local variables that never get their values changed must be declared final. By explicitly declaring them in such a way, a reader of the source code obtains information about how the variable is supposed to be used. |
| Declare Variables In One Statement Each | Several variables (attributes and local variables) should not be declared in the same statement. |
| Instantiated Classes Should Be Final | This rule recommends making all instantiated classes final. It checks classes which are present in the object model. Classes from search/classpath are ignored. |
| List All Public And Package Members First | Enforces a standard to improve readability. Methods/data in your class should be ordered properly. |
| Order Of Appearance Of Modifiers | Checks for correct ordering of modifiers. For classes, this includes visibility (public, protected or private), abstract, static, final. For attributes, this includes visibility (public, protected or private), static, final, transient, volatile. For operations, this includes visibility (public, protected or private), abstract, static, final, synchronized, native. |
| Put the Main Function Last | Tries to make the program comply with various coding standards regarding the form of the class definitions. |

TABLE 13

Documentation Audits

| Documentation Audits | Description |
|---|---|
| Bad Tag In JavaDoc Comments | This rule verifies code against accidental use of improper JavaDoc tags. |
| Distinguish Between JavaDoc And Ordinary Comments | Checks whether the JavaDoc comments in your program ends with '**/' and ordinary C-style ones with '*/.' |

TABLE 14

Naming Style Audits

| Naming Style Audits | Description |
|---|---|
| Class Name Must Match Its File Name | Checks whether top level classes or interfaces have the same name as the file in which they reside. |
| Group Operations With Same Name Together | Enforces standard to improve readability. |
| Naming Conventions | Takes a regular expression and item name and reports all occurrences where the pattern does not match the declaration. |
| Names Of Exception Classes | Names of classes which inherit from Exception should end with Exception. |
| Use Conventional Variable Names | One-character local variable or parameter names should be avoided, except for temporary and looping variables, or where a variable holds an undistinguished value of a type. |

TABLE 15

Performance Audits

| Performance Audits | Description |
|---|---|
| Avoid Declaring Variables Inside Loops | This rule recommends declaring local variables outside the loops since declaring variables inside the loop is less efficient. |
| Append To String Within a Loop | Performance enhancements can be obtained by replacing String operations with StringBuffer operations if a String object is appended within a loop. |
| Complex Loop Expressions | Avoid using complex expressions as repeat conditions within loops. |

TABLE 16

Possible Error Audits

| Possible Error Audits | Description |
|---|---|
| Avoid Public And Package Attributes | Declare the attributes either private or protected, and provide operations to access or change them. |
| Avoid Statements With Empty Body | Avoid statements with empty body. |
| Assignment To For-Loop Variables | 'For'-loop variables should not be assigned. |
| Don't Compare Floating Point Types | Avoid testing for equality of floating point numbers since floating-point numbers that should be equal are not always equal due to rounding problems. |
| Enclosing Body Within a Block | The statement of a loop must always be a block. The 'then' and 'else' parts of 'if'-statements must always be blocks. This makes it easier to add statements without accidentally introducing bugs in case the developer forgets to add braces. |
| Explicitly Initialize All Variables | Explicitly initialize all variables. The only reason not to initialize a variable is where it's declared is if the initial value depends on some computation occurring first. |

TABLE 16-continued

Possible Error Audits

| Possible Error Audits | Description |
| --- | --- |
| Method finalize() Doesn't Call super.finalize() | Calling of super.finalize() from finalize() is good practice of programming, even if the base class doesn't define the finalize() method. This makes class implementations less dependent on each other. |
| Mixing Logical Operators Without Parentheses | An expression containing multiple logical operators should be parenthesized properly. |
| No Assignments In Conditional Expressions | Use of assignment within conditions makes the source code hard to understand. |
| Use 'equals' Instead Of '==' | The '==' operator used on strings checks if two string objects are two identical objects. In most situations, however, one likes to simply check if two strings have the same value. In these cases, the 'equals' method should be used. |
| Use 'L' Instead Of '1' at the end of integer constant | It is better to use uppercase 'L' to distinguish the letter 'l' from the number '1.' |
| Use Of the 'synchronized' Modifier | The 'synchronized' modifier on methods can sometimes cause confusion during maintenance as well as during debugging. This rule therefore recommends against using this modifier, and instead recommends using 'synchronized' statements as replacements. |

TABLE 17

Superfluous Content Audits

| Superfluous Content Audits | Description |
| --- | --- |
| Duplicate Import Declarations | There should be at most one import declaration that imports a particular class/package. |
| Don't Import the Package the Source File Belongs To | No classes or interfaces need to be imported from the package to which the source code file belongs. Everything in that package is available without explicit import statements. |
| Explicit Import Of the java.lang Classes | Explicit import of classes from the package 'java.lang' should not be performed. |
| Equality Operations On Boolean Arguments | Avoid performing equality operations on Boolean operands. 'True' and 'false' literals should not be used in conditional clauses. |
| Imported Items Must Be Used | It is not legal to import a class or an interface and never use it. This rule checks classes and interfaces that are explicitly imported with their names - that is not with import of a complete package, using an asterisk. If unused class and interface imports are omitted, the amount of meaningless source code is reduced - thus the amount of code to be understood by a reader is minimized. |
| Unnecessary Casts | Checks for the use of type casts that are not necessary. |
| Unnecessary 'instanceof' Evaluations | Verifies that the runtime type of the left-hand side expression is the same as the one specified on the right-hand side. |
| Unused Local Variables And Formal Parameters | Local variables and formal parameter declarations must be used. |
| Use Of Obsolete Interface Modifier | The modifier 'abstract' is considered obsolete and should not be used. |
| Use Of Unnecessary Interface Member Modifiers | All interface operations are implicitly public and abstract. All interface attributes are implicitly public, final and static. |
| Unused Private Class Member | An unused class member might indicate a logical flaw in the program. The class declaration has to be reconsidered in order to determine the need of the unused member(s). |

Figure 8A:
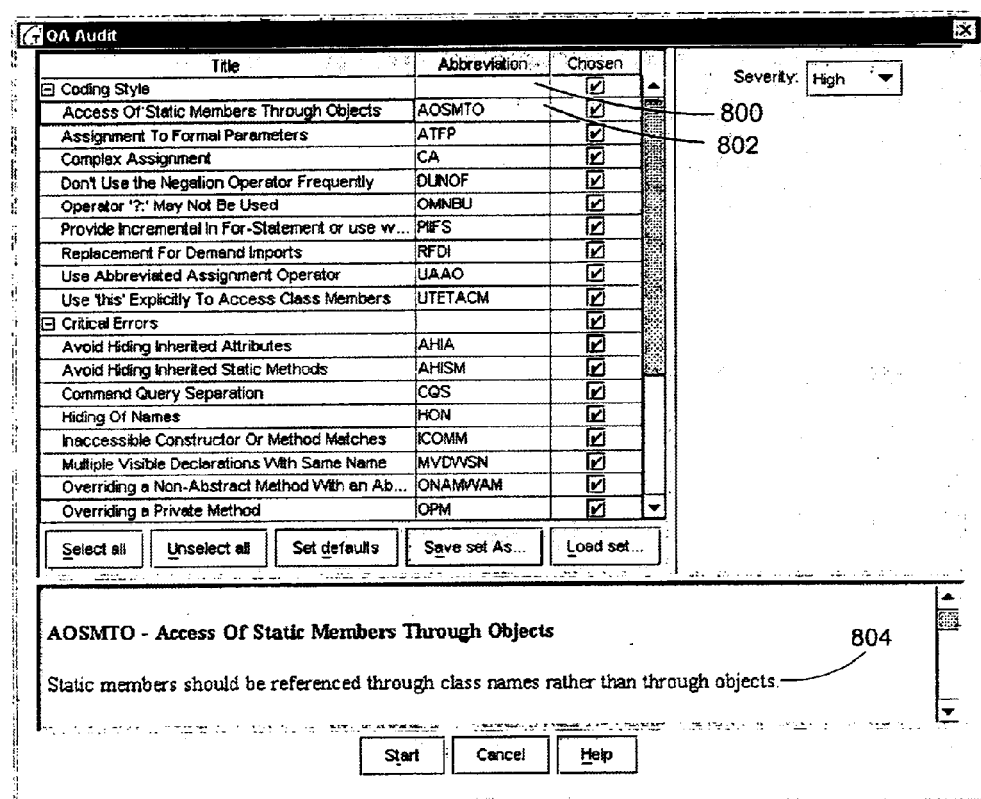
FIG. 8A depicts a user interface displayed by the software development tool depicted in FIG. 2, where the user interface displays a list of predefined criteria which the software development tool checks in the source code.
Figure 8B:
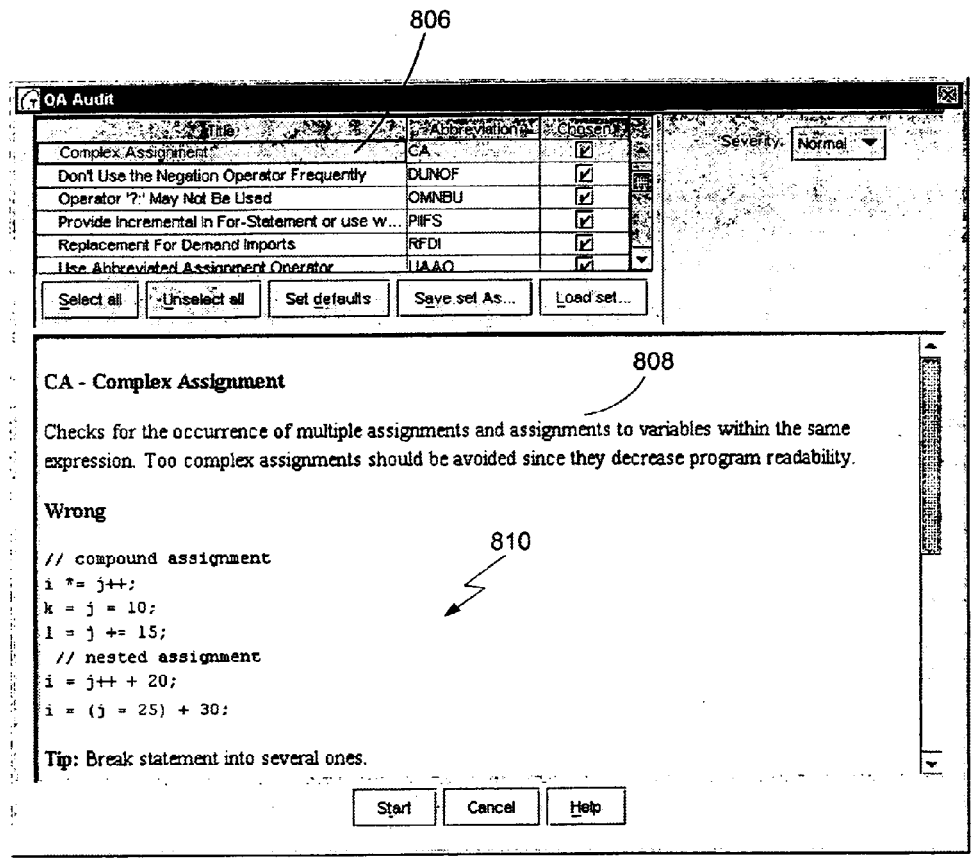
FIG. 8B depicts a user interface displayed by the software development tool depicted in FIG. 2, where the user interface displays the definition of the criteria which the software development tool checks in the source code, and an example of source code which does not conform to the criteria.
Figure 8C:
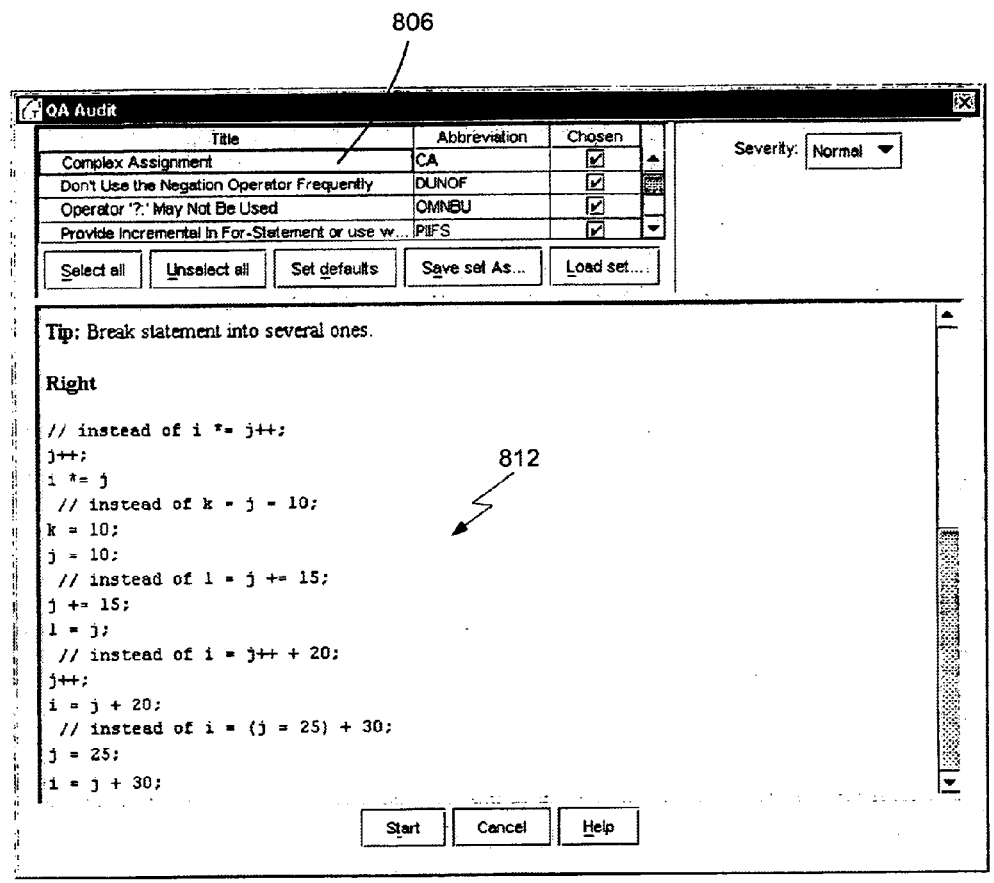
FIG. 8C depicts a user interface displayed by the software development tool depicted in FIG. 2, where the user interface displays an example of source code which conforms to the criteria which the software development tool checks in the source code.

If the QA module determines that the source code does not conform, an error message is provided to the developer. For example, as depicted in FIG. 8A, the software development tool checks for a variety of coding styles 800. If the software development tool were to check for "Access of Static Members Through Objects" 802, it would verify whether static members are referenced through class names rather than through objects 804. Further, as depicted in FIG. 8B, if the software development tool were to check for "Complex Assignment" 806, the software development tool would check for the occurrence of multiple assignments and assignments to variables within the same expression to avoid complex assignments since these decrease program readability 808. An example of source code having a complex assignment 810 and source code having a non-complex assignment 812 are depicted in FIGS. 8B and 8C, respectively. The QA module of the software development tool scans the source code for other syntax errors and/or other deviations from well known rules, as described above, and provides an error message if any such errors are detected.

The improved software development tool of the present invention is used to develop source code in a project. The project comprises a plurality of files and the source code of a chosen one of the plurality of files is written in a given language. The software development tool determines the language of the source code of the chosen file, converts the source code from the language into a language-neutral representation, uses the language-neutral representation to textually display the source code of the chosen file in the language, and uses the language-neutral representation to display a graphical representation of at least a portion of the project. As discussed above, in an alternative embodiment, the textual display may be obtained directly from the source code file. The source code and the graphical representation are displayed simultaneously.

The improved software development tool of the present invention is also used to develop source code. The software development tool receives an indication of a selected language for the source code, creates a file to store the source code in the selected language, converts the source code from the selected language into a language-neutral representation, uses the language-neutral representation to display the source code of the file, and uses the language-neutral representation to display a graphical representation of the file. Again, the source code and the graphical representation are displayed simultaneously.

Moreover, if the source code in the file is modified, the modified source code and a graphical representation of at least a portion of the modified source code are displayed simultaneously. The QA module of the software development tool provides an error message if the modification does not conform to predefined or user-defined styles, as described above. The modification to the source code may be received by the software development tool via the programmer editing the source code in the textual pane or the graphical pane, or via some other independent software tool that the programmer uses to modify the code. The graphical representation of the project may be in Unified Modeling Language; however, one skilled in the art will recognize that other graphical representations of the source code may be displayed. Further, although the present invention is described and shown using the various views of the UML, one of ordinary skill in the art will recognize that other views may be displayed.

Figure 9:
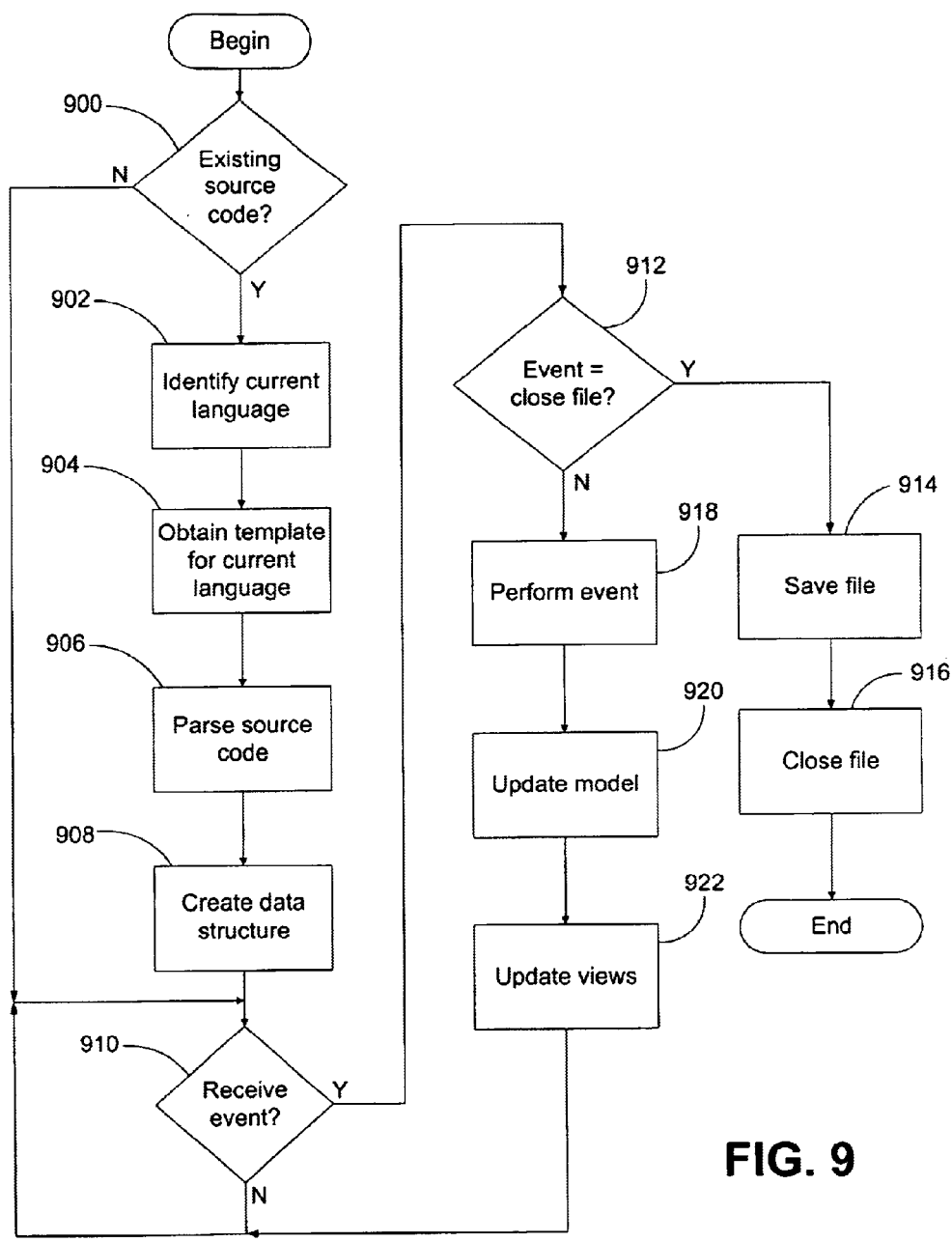
FIG. 9 depicts a flow diagram of the steps performed by the software development tool depicted in FIG. 2.

FIG. 9 depicts a flow diagram of the steps performed by the software development tool to develop a project in accordance with methods consistent with the present invention. As previously stated, the project comprises a plurality of files. The developer either uses the software development tool to open a file that contains existing source code, or to create a file in which the source code will be developed. If the software development tool is used to open the file, determined in step 900, the software development tool initially determines the programming language in which the code is written (step 902). The language is identified by the extension of the file, e.g., "java" identifies source code written in the Java™ language, while ".cpp" identifies source code written in C++. The software development tool then obtains a template for the current programming language, i.e., a collection of generalized definitions for the particular language that can be used to build the data structure (step 904). For example, the templates used to define a new Java™ class contains a default name, e.g., "Class1," and the default code, "public class Class1 { }." Such templates are well known in the art. For example, the "Microsoft Foundation Class Library" and the "Microsoft Word Template For Business Use Case Modeling" are examples of standard template libraries from which programmers can choose individual template classes. The software development tool uses the template to parse the source code (step 906), and create the data structure (step 908). After creating the data structure or if there is no existing code, the software development tool awaits an event, i.e., a modification or addition to the source code by the developer (step 910). If an event is received and the event is to close the file (step 912), the file is saved (step 914) and closed (step 916). Otherwise, the software development tool performs the event (step 918), i.e., the tool makes the modification. The software development tool then updates the TMM or model (step 920), as discussed in detail below, and updates both the graphical and the textual views (step 922).

Figure 10A:
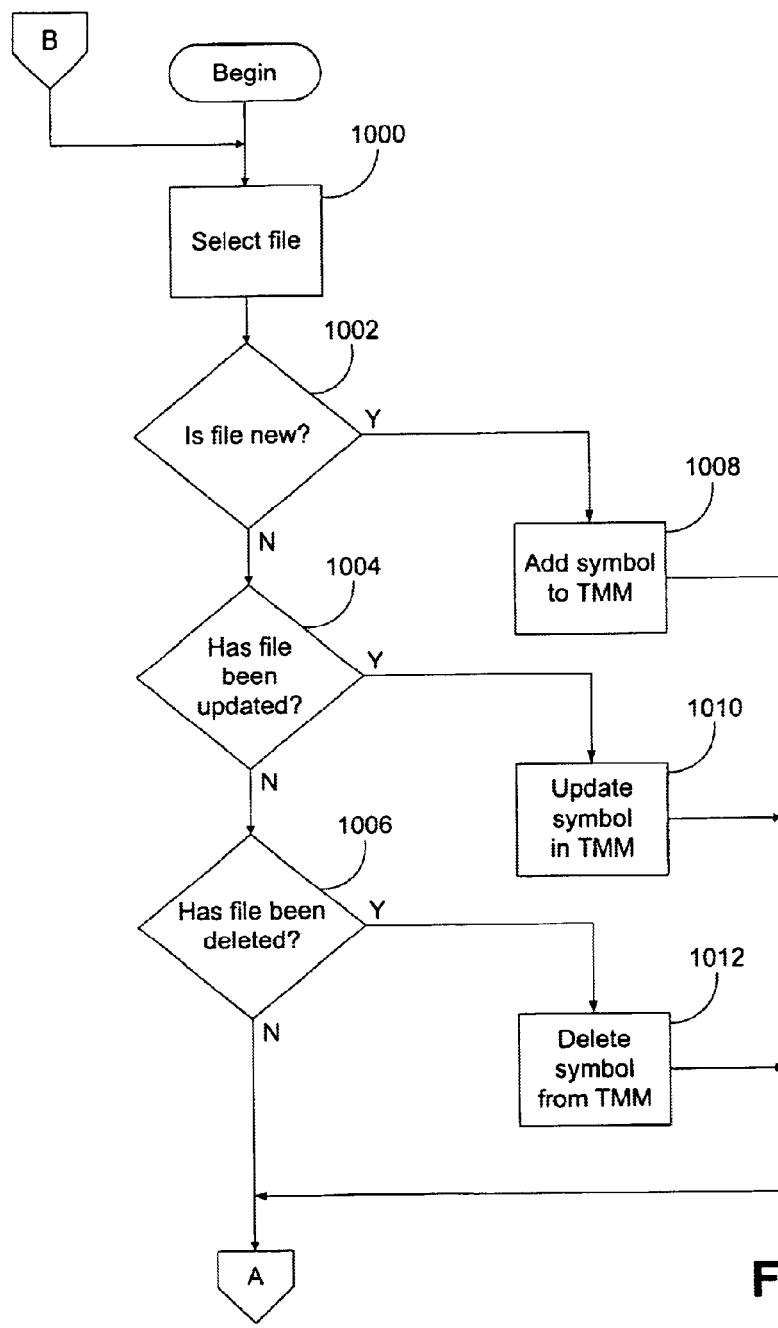
FIGS. 10A and 10B depict a flow diagram illustrating the update model step of FIG. 9.
Figure 10B:
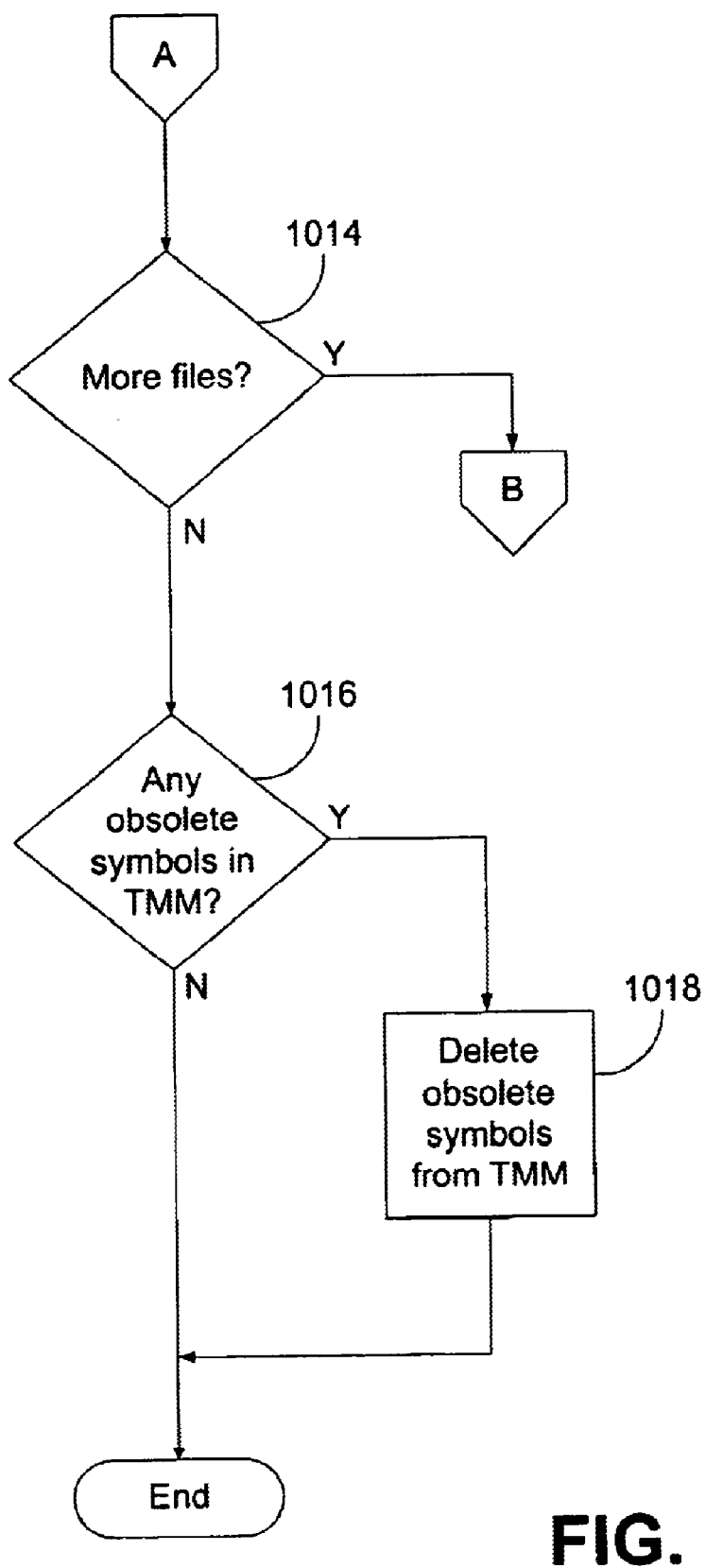

FIGS. 10A and 10B depict a flow diagram illustrating the update model step of FIG. 9. The software development tool selects a file from the project (step 1000), and determines whether the file is new (step 1002), whether the file has been updated (step 1004), or whether the file has been deleted (step 1006). If the file is new, the software development tool adds the additional symbols from the file to the TMM (step 1008). To add the symbol to the TMM, the software development tool uses the template to parse the symbol to the TMM. If the file has been updated, the software development tool updates the symbols in the TMM (step 1010). Similar to the addition of a symbol to the TMM, the software development tool uses the template to parse the symbol to the TMM. If the file has been deleted, the software development tool deletes the symbols in the TMM (step 1012). The software development tool continues this analysis for all files in the project. After all files are analyzed (step 1014), any obsolete symbols in the TMM (step 1016) are deleted (step 1018).

Figure 11:
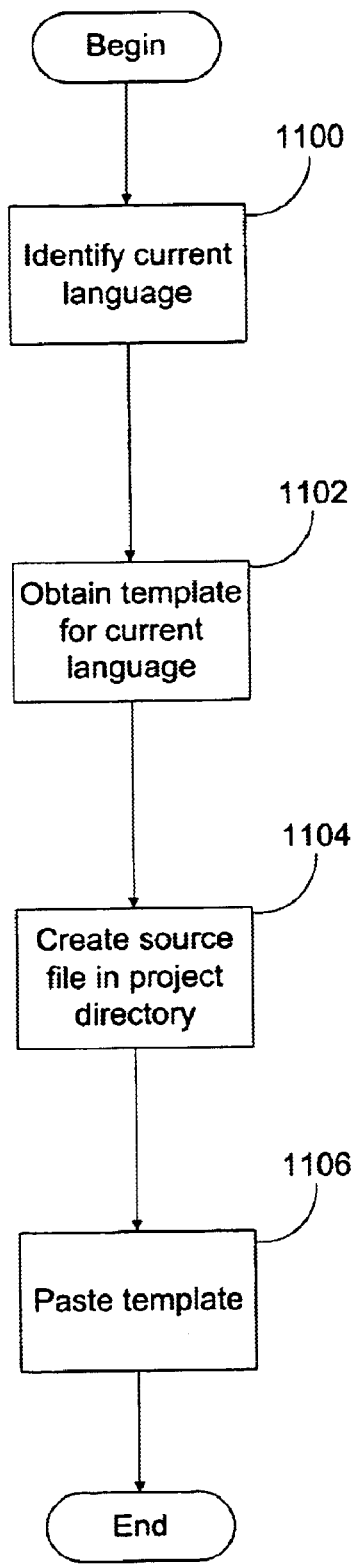
FIG. 11 depicts a flow diagram of the steps performed by the software development tool in FIG. 2 when creating a class.

FIG. 11 depicts a flow diagram illustrating the performance of an event, specifically the creation of a class, in accordance with methods consistent with the present invention. After identifying the programming language (step 1100), the software development tool obtains a template for the language (step 1102), creates a source code file in the project directory (step 1104), and pastes the template into the file (step 1106). The project directory corresponds to the SCI model 302 of FIG. 3. Additional events which a developer may perform using the software development tool include the creation, modification or deletion of packages, projects, attributes, interfaces, links, operations, and the closing of a file.

Figure 12:
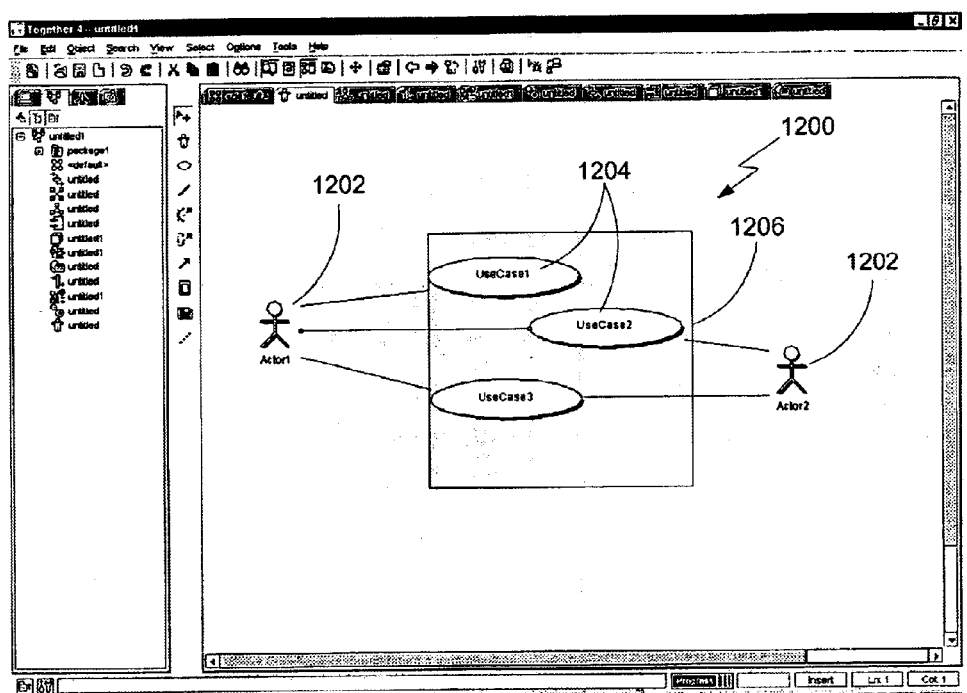
FIG. 12 depicts a user interface displayed by the software development tool depicted in FIG. 2, where the user interface displays a use case diagram of source code.
Figure 13:
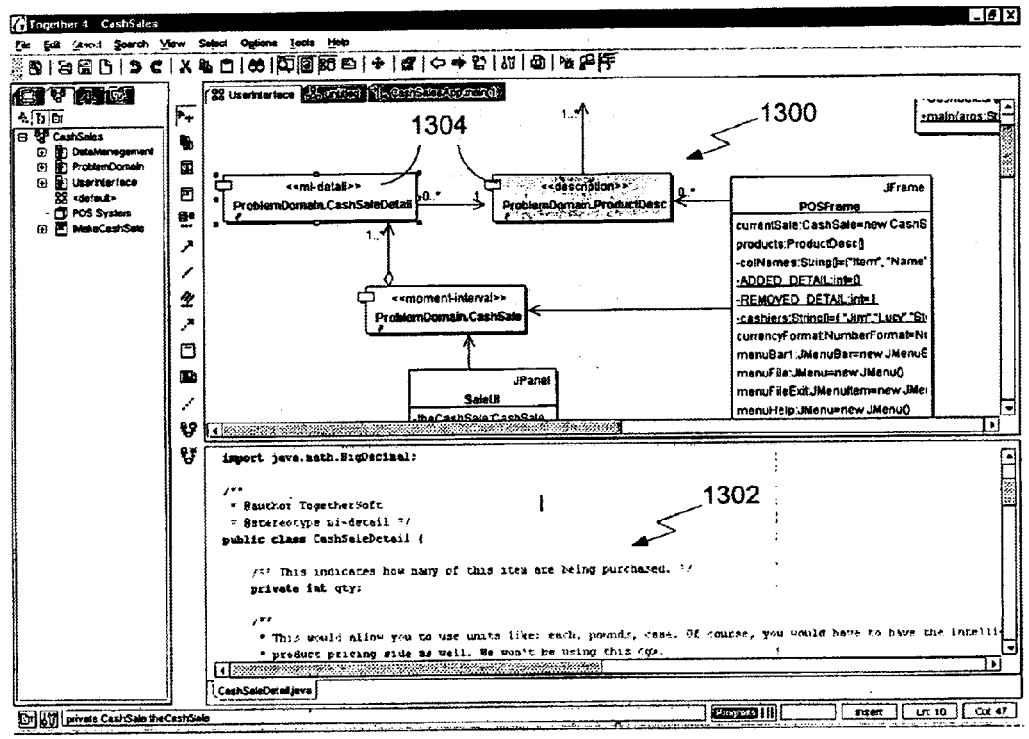
FIG. 13 depicts a user interface displayed by the software development tool depicted in FIG. 2, where the user interface displays both a class diagram and a textual view of source code.

Applications to be developed using the software development tool are collectively broken into three views of the application: the static view, the dynamic view, and the functional view. The static view is modeled using the use-case and class diagrams. A use case diagram 1200, depicted in FIG. 12, shows the relationship among actors 1202 and use cases 1204 within the system 1206. A class diagram 1300, depicted in FIG. 13 with its associated source code 1302, on the other hand, includes classes 1304, interfaces, packages and their relationships connected as a graph to each other and to their contents.

Figure 14:
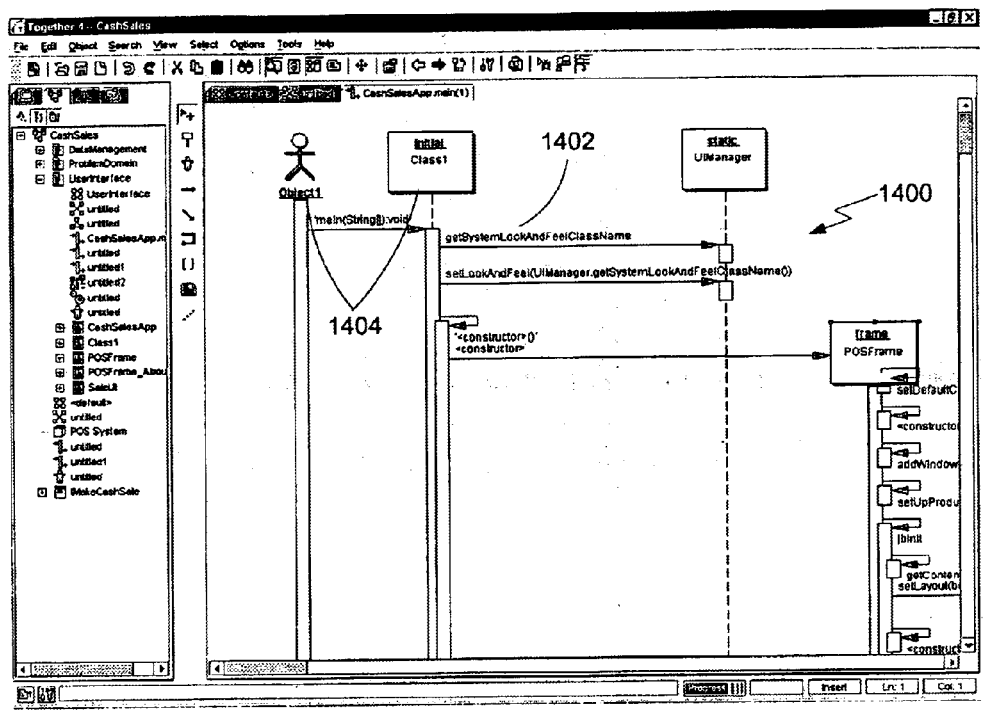
FIG. 14 depicts a user interface displayed by the software development tool depicted in FIG. 2, where the user interface displays a sequence diagram of source code.
Figure 15:
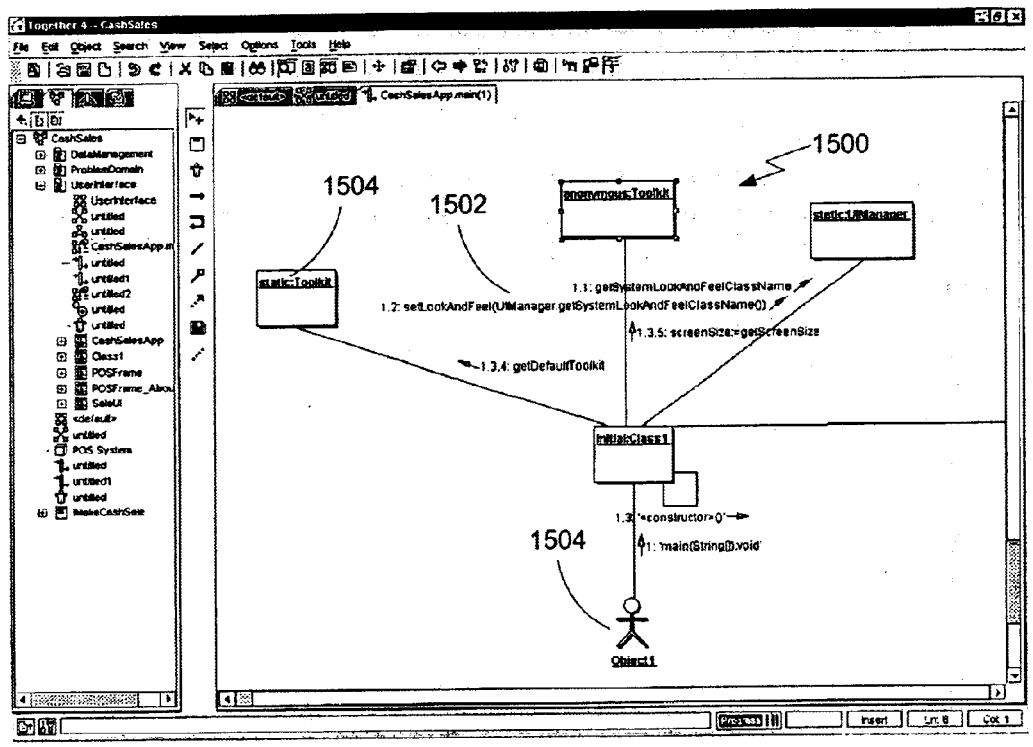
FIG. 15 depicts a user interface displayed by the software development tool depicted in FIG. 2, where the user interface displays a collaboration diagram of source code.

The dynamic view is modeled using the sequence, collaboration and statechart diagrams. As depicted in FIG. 14, a sequence diagram 1400 represents an interaction, which is a set of messages 1402 exchanged among objects 1404 within a collaboration to effect a desired operation or result. In a sequence diagram 1400, the vertical dimension represents time and the horizontal dimension represents different objects. A collaboration diagram 1500, depicted in FIG. 15, is also an interaction with messages 1502 exchanged among objects 1504, but it is also a collaboration, which is a set of objects 1504 related in a particular context. Contrary to sequence diagrams 1400 (FIG. 14), which emphasize the time ordering of messages along the vertical axis, collaboration diagrams 1500 (FIG. 15) emphasize the structural organization of objects.

Figure 16:
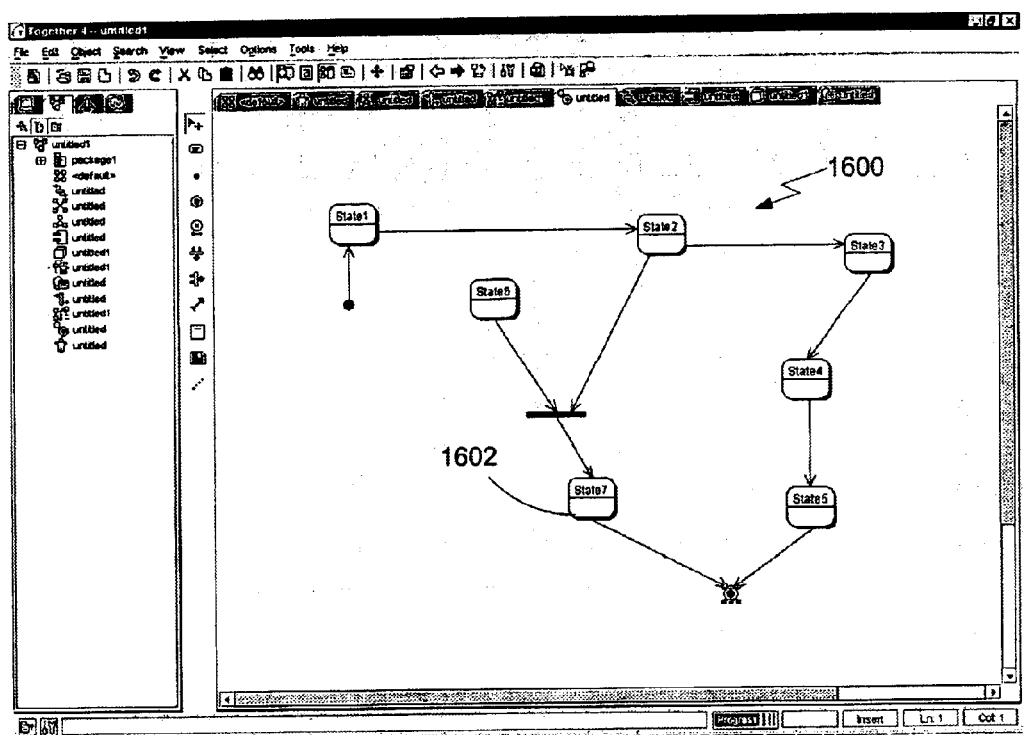
FIG. 16 depicts a user interface displayed by the software development tool depicted in FIG. 2, where the user interface displays a statechart diagram of source code.

A statechart diagram 1600 is depicted in FIG. 16. The statechart diagram 1600 includes the sequences of states 1602 that an object or interaction goes through during its life in response to stimuli, together with its responses and actions. It uses a graphic notation that shows states of an object, the events that cause a transition from one state to another, and the actions that result from the transition.

Figure 17:
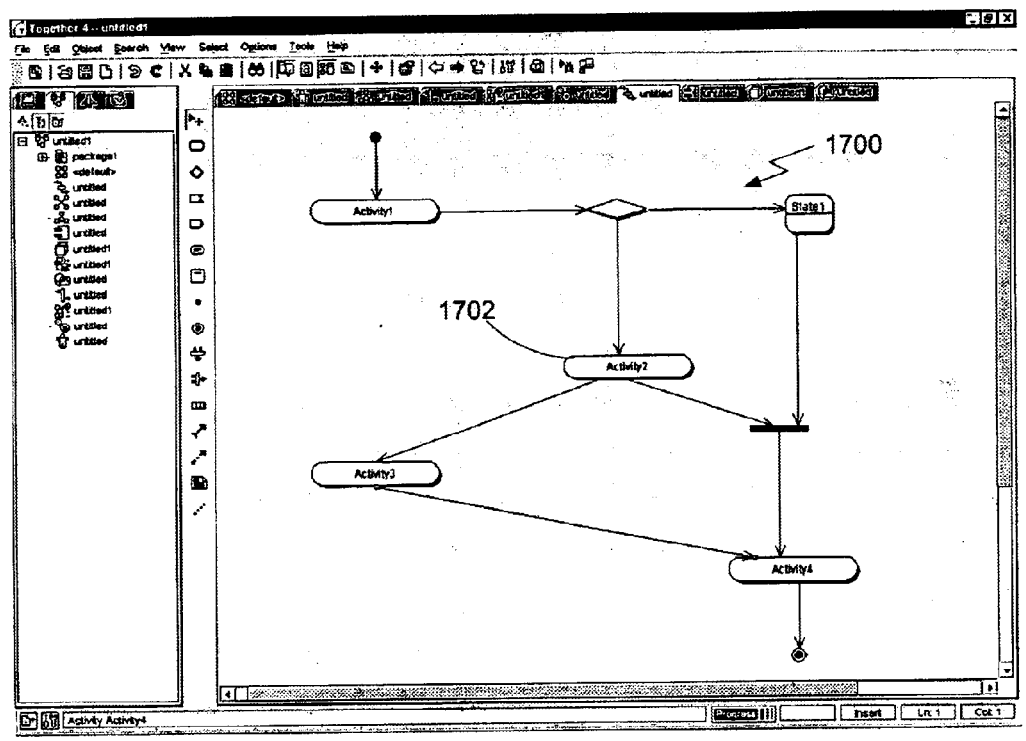
FIG. 17 depicts a user interface displayed by the software development tool depicted in FIG. 2, where the user interface displays an activity diagram of source code.

The functional view can be represented by activity diagrams 1700 and more traditional descriptive narratives such as pseudocode and minispecifications. An activity diagram 1700 is depicted in FIG. 17, and is a special case of a state diagram where most, if not all, of the states are action states 1702 and where most, if not all, of the transitions are triggered by completion of the actions in the source states. Activity diagrams 1700 are used in situations where all or most of the events represent the completion of internally generated actions.

Figure 18:
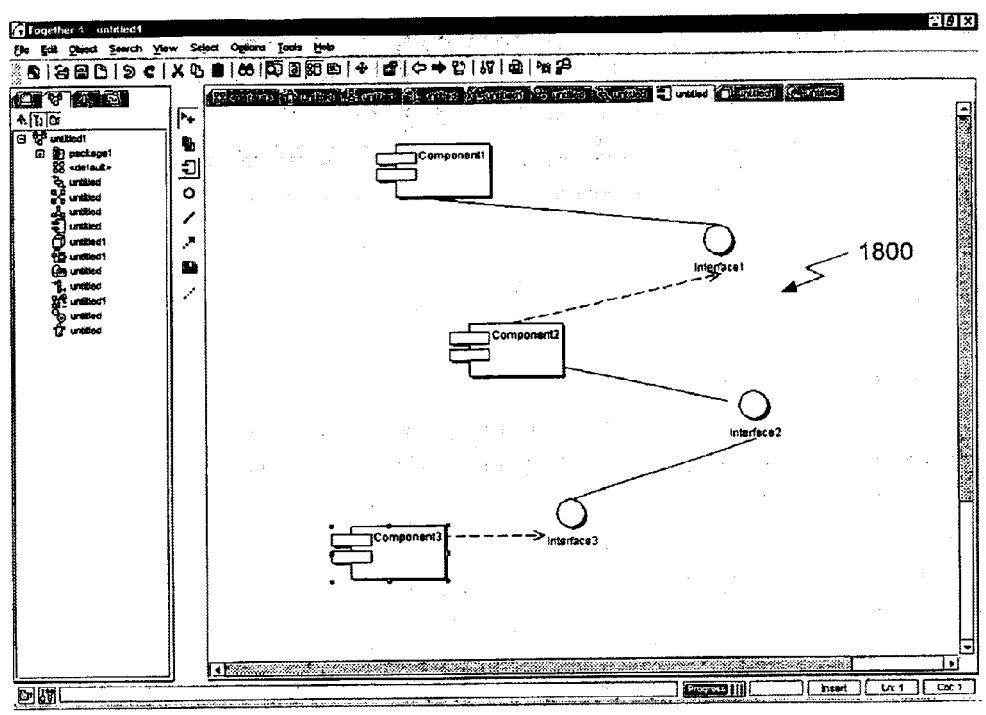
FIG. 18 depicts a user interface displayed by the software development tool depicted in FIG. 2, where the user interface displays a component diagram of source code.
Figure 19:
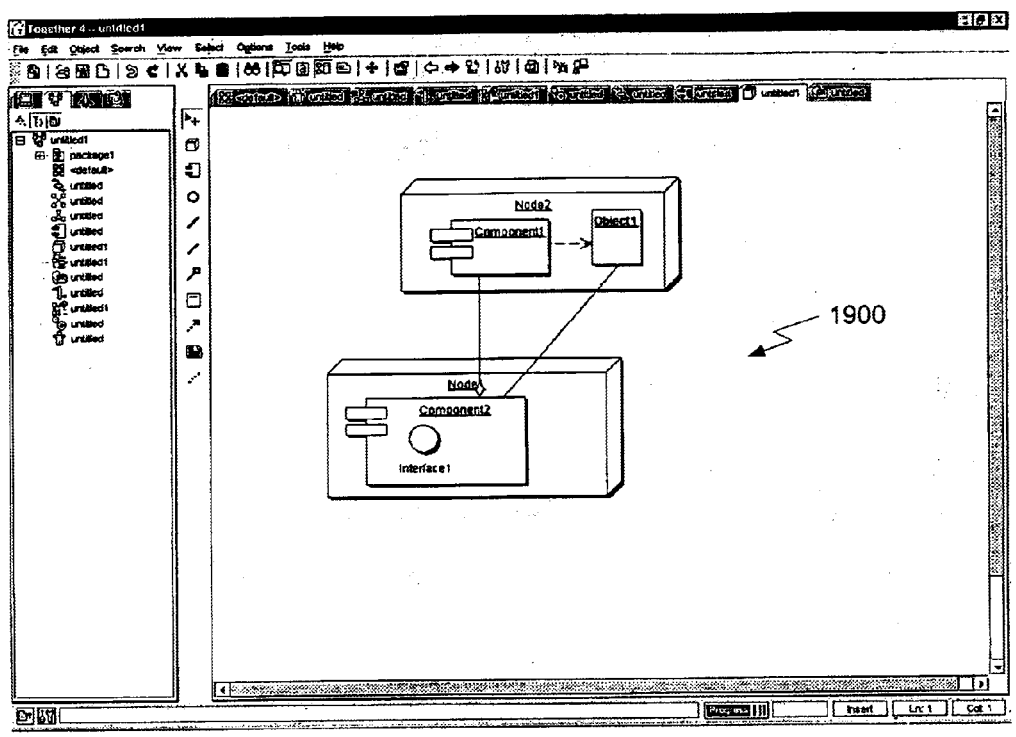
FIG. 19 depicts a user interface displayed by the software development tool depicted in FIG. 2, where the user interface displays a deployment diagram of source code.

There is also a fourth view mingled with the static view called the architectural view. This view is modeled using package, component and deployment diagrams. Package diagrams show packages of classes and the dependencies among them. Component diagrams 1800, depicted in FIG. 18, are graphical representations of a system or its component parts. Component diagrams 1800 show the dependencies among software components, including source code components, binary code components and executable components. As depicted in FIG. 19, deployment diagrams 1900 are used to show the distribution strategy for a distributed object system. Deployment diagrams 1900 show the configuration of run-time processing elements and the software components, processes and objects that live on them.

Although discussed in terms of class diagrams, one skilled in the art will recognize that the software development tool of the present invention may support these and other graphical views.

Find and Display Linked Elements

The graphical display of complex source code is difficult to analyze because the links and elements connected to a given element may make the graphical view of the source code confusing. Moreover, if the display includes more than one type of link between the elements, it increases the complexity of the graphical display. Thus, the software development tool in accordance with methods and systems consistent with the present invention allows a developer to specify a type of link and search for all elements linked to a selected element by the specific type of link. The developer may specify one or more types of links for which the software development tool will search. In addition, the software development tool allows the developer to specify a number of links and to search for all elements linked to the selected element within the specific number of links.

Figure 20A:
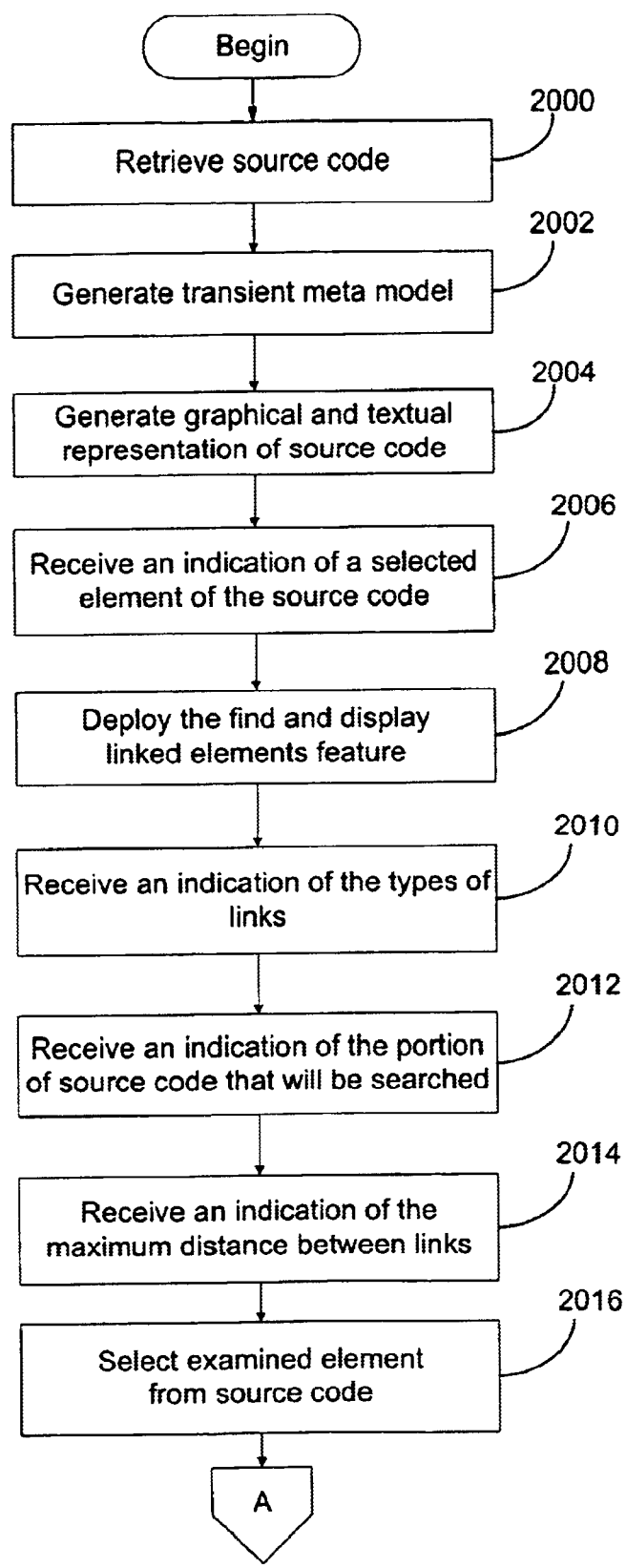
FIGS. 20A and B depict a flow diagram of the steps performed by the software development tool depicted in FIG. 2 when finding and displaying linked elements.
Figure 21:
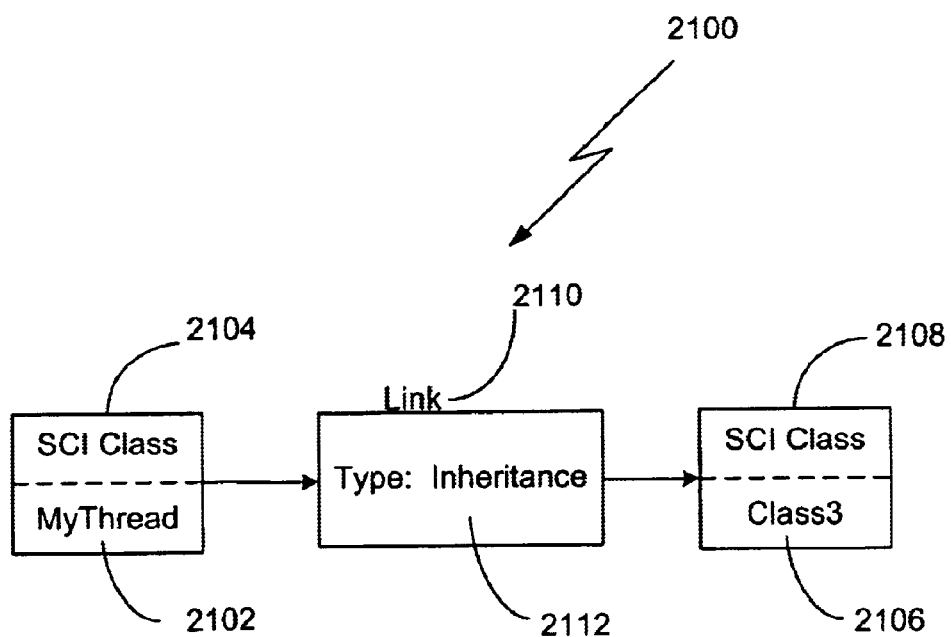
FIG. 21 depicts the data structure of the language-neutral representation generated by the software development tool depicted in FIG. 2 from a line of source code.

FIGS. 20A and B depict a flow diagram illustrating the steps performed by the software development tool to find and display linked elements. The first step performed by the software development tool is to retrieve the source code (step 2000 in FIG. 20A) from memory. Alternatively, the developer may create new source code. Using the source code, the software development tool generates the TMM (step 2002). As discussed above, the TMM stores a language-neutral representation of the source code. For example, for the following line of source code, the software development tool will create the data structure 2100 of the language-neutral representation depicted in FIG. 21:

public class MyThread extends Class3

In particular, because MyThread 2102 is defined as a class, it is contained in SCI class 2104. Class3 2106 is also defined as a class, and is contained in SCI class 2108. As is well known, "MyThread extends Class3" indicates that MyThread 2102 is considered a sub class of Class3 2106. Thus, the link 2110 between MyThread and Class3 is an inheritance 2112, as discussed further below.

Figure 22:
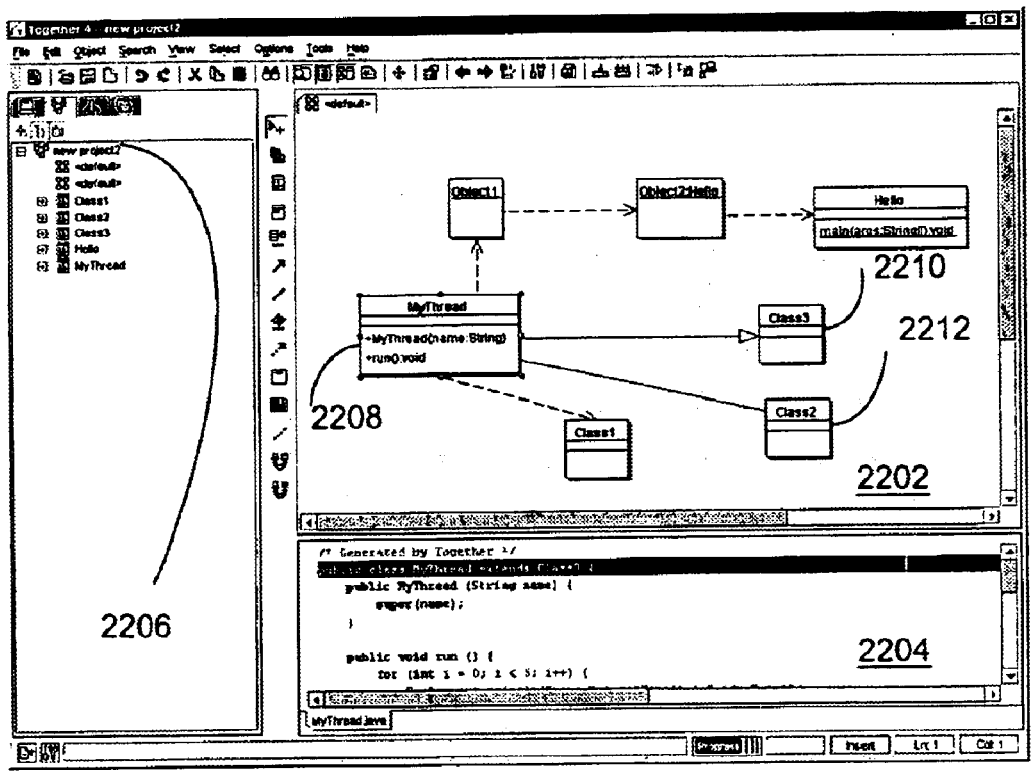
FIG. 22 depicts a user interface displayed by the software development tool depicted in FIG. 2, where the user interface displays both a class diagram and a textual view of a project.
Figure 23:
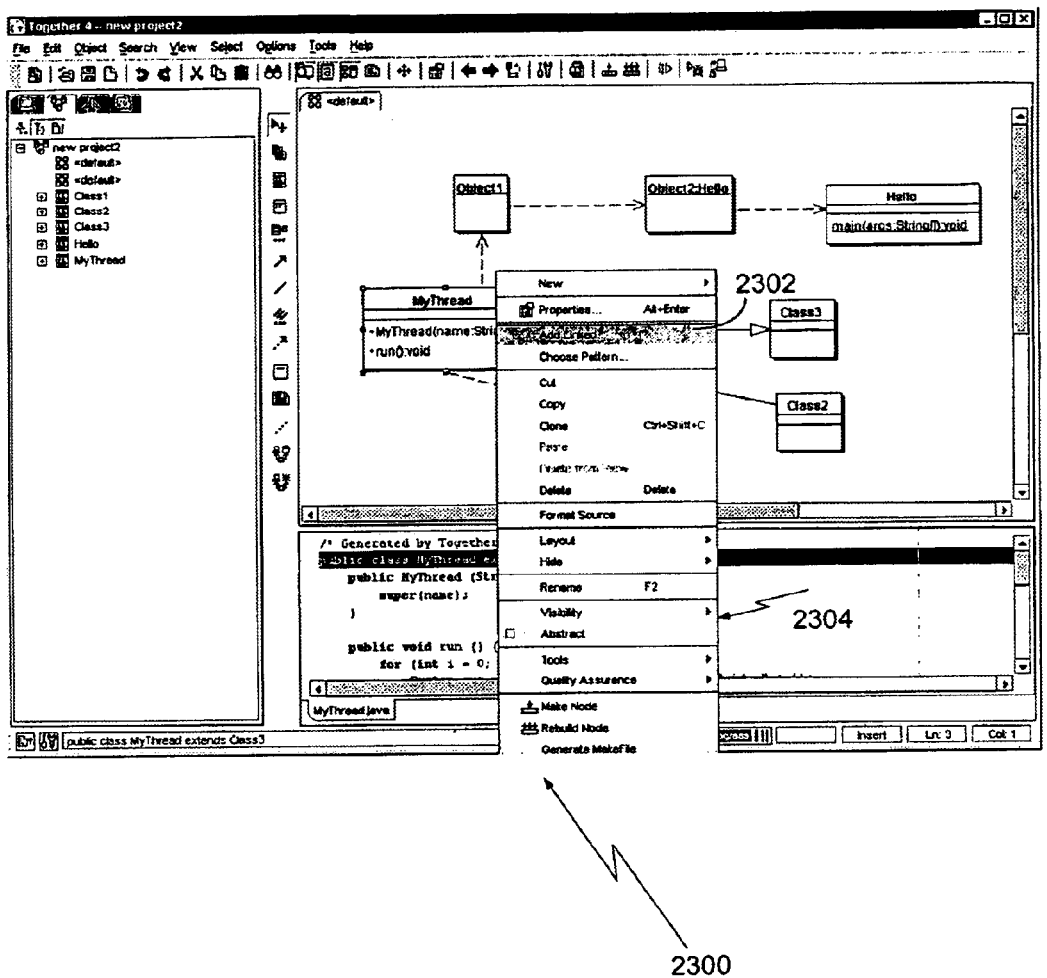
FIG. 23 depicts the deployment of the feature to find and display linked elements using the software development tool depicted in FIG. 2.

After generating the TMM, the software development tool then generates the graphical and textual representations of the source code from the language-neutral representation in the TMM (step 2004). Alternatively, as discussed above, the textual view of the source code may be obtained directly from the source code file. For example, FIG. 22 depicts screen 2200 with both a graphical representation 2202 and a textual representation 2204 of the source code contained in the project 2206. The software development tool then receives an indication of a selected element of the source code when the developer selects the element (step 2006). The selected element 2208 depicted in FIG. 22 is the class "MyThread." The developer deploys the find and display linked elements feature by selecting the "Add Linked" option 2302 illustrated on the screen 2300 in FIG. 23. Although the software development tool is depicted with a pull-down menu 2304, other known input techniques, such as a keyboard input or an icon selection, may also be used to deploy the find and display linked elements feature.

Figure 24:
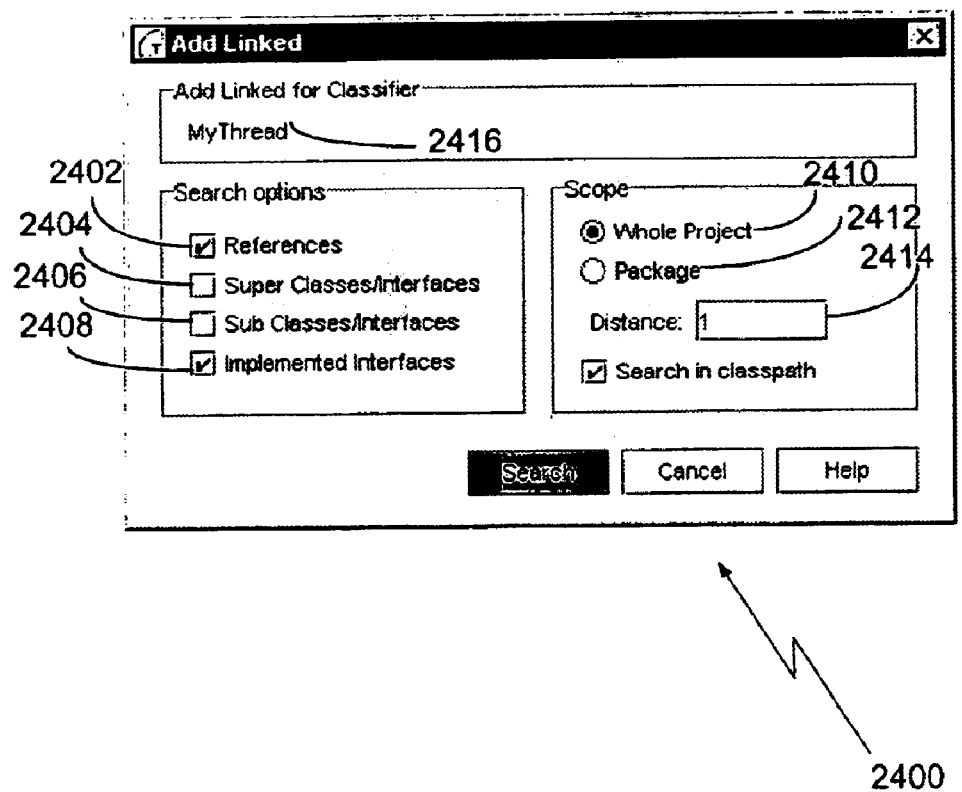
FIG. 24 depicts a first implementation of the feature to find and display linked elements using the software development tool depicted in FIG. 2.

After the deployment of the find and display linked elements feature (step 2008), the software development tool displays Add Linked screen 2400 depicted in FIG. 24. The software development tool then receives an indication of the types of links (step 2010). The software development tool also receives an indication of the portion of the source code that will be searched (step 2012). In addition, the software development tool receives an indication of the maximum distance between the links (step 2014).

The types of links are categorized in the example depicted in FIG. 24 as references 2402, super classes/interfaces 2404, sub classes/interfaces 2406 and implemented interfaces 2408. References 2402 include both associations and dependencies. An "association" is the semantic relationship between two or more classifiers that involves connections among their instances. There are two specialized forms of associations: an aggregation and a composition. An "aggregation" is a type of association that denotes a whole-part relationship between an aggregate (whole) and a component part. A "composition" is a form of aggregation in which the parts belong to only one whole, and the parts live or die with the whole. A "dependency" is a relationship between two elements in which a change to the independent element will affect the dependent element. In some situations, a link may be both an association and a dependency. For example, there is an association between class A and class B in the following source code:

```
public class A {
    ...
    public class B {
        ...
    }
}
```

In this example, class B is defined within class A, and is thus a part of class A. Thus, the association defined above is also an aggregation. Moreover, any changes to the independent class B will affect the dependent class A. Therefore, there is also a dependency between class A and class B.

A second example of an association is illustrated below:

```
public class C {
    ...
    public void init() {
        D usedObject = new D();
        add( usedObject.methodOne() );
        add( usedObject.methodTwo(
            usedObject.getPrivateText() ));
    }
    ...
}
public class D {
    public Label methodOne() {
        return new Label1( privateText );
    }
    public Label methodTwo( String text ) {
        return new Label1( text );
    }
    public String getPrivateText() {
        return privateText;
    }
    private String privateText = "This is some private text";
}
```

In this example, class C invokes various methods defined in class D. Class D, however, is not a part of class C, and thus, the link between class C and class D is not an aggregation. Any changes to the methods in class D will affect class C. Thus, there is a dependency between class C and class D in this example.

A "super class" is a base class for a number of other classes, i.e., a class that is inherited by a number of other classes, known as sub classes. A sub class inherits all the attributes and methods from a super class. Thus, the link between a super class and a sub class is known as an "inheritance." Similarly, a "super interface" is a base interface for a number of other interfaces, known as sub interfaces. A sub interface inherits all the methods and constants from its super interface. Thus, the link between a super interface and a sub interface is known as an "inheritance." Super classes/sub classes and similarly, super interfaces/sub interfaces are identified by an "extends" clause. For example, the following source code indicates that class E is a sub class of class F, and accordingly, that class F is a super class of class E:

public class E extends F

Similarly, the following source code indicates that interface G is a sub interface of interface H, and accordingly, that interface H is a super interface of interface G:

public interface G extends H

An implemented interface 2408 is an implementation of an interface. When a class implements an interface, it provides an implementation for each method of that interface, i.e., it provides the information needed to create each method of that interface and allows each method to participate in providing an appropriate set of services. The following source code indicates that class I implements interface J:

public class I implements J

Thus, the link between class I and interface J is an implemented interface.

Rather than searching the links by categories, as shown in the "Add Linked" screen 2400 of FIG. 24, in an alternate embodiment, the software development tool may search for the specific type of link, e.g., an inheritance, a dependency, or an association. The software development tool may search the whole project 2410 (i.e., the directory) or the package 2412 (i.e., the subdirectory) containing the selected element. In the example depicted in FIG. 24, the developer chose to search the whole project 2410 containing MyThread 2416 for references 2402 and implemented interfaces 2408 that are at most one 2414 link from MyThread 2416.

In response to the developer's request, the software development tool selects an element other than the element selected in step 2006 ("the examined element") (step 2016). The software development tool determines if the distance between the examined element and the selected element is at most the maximum distance (step 2018 in FIG. 20B). If the distance is within the maximum distance, the software development tool determines if those links are of the desired type (step 2020). If the links are of the desired type, then the software development tool adds the examined element to a list of elements that satisfy the criteria for the type of link and the distance (step 2022). The software development tool then determines whether there are any more elements in the source code that have not been examined to determine if they satisfy the distance and link type requirement (step 2024). If the examined element is not connected to the selected element by at most the number of links (step 2018), or if the links are not of the desired type (step 2020), processing also continues to step 2024. If there are more elements to be considered, processing continues with the next element (step 2026) to step 2018.

For an example of the processing performed in steps 2018 through 2026, consider the following example related to the project 2206 shown in FIG. 22. If the options in FIG. 24 are chosen, and the examined element is Class3 2210, the software development tool searches the TMM to find the links between MyThread 2208 and Class3 2210. The TMM reveals an inheritance from MyThread 2208 to Class3 2210, i.e., Class3 2210 is a super class of MyThread 2208. Because the software development tool is not searching for super classes 2404, Class3 2210 is not added to the list of elements. If the next examined element is Class2 2212, the software development tool searches the TMM to find the links between MyThread 2208 and Class2 2212. The TMM reveals an association between Class2 2212 and MyThread 2208. Thus, because the examined element Class2 2212 is connected to the selected element MyThread 2208 by one 2414 link, and the link is an association, i.e., a reference 2402, the software development tool adds Class2 2212 to the list of elements.

Figure 20B:
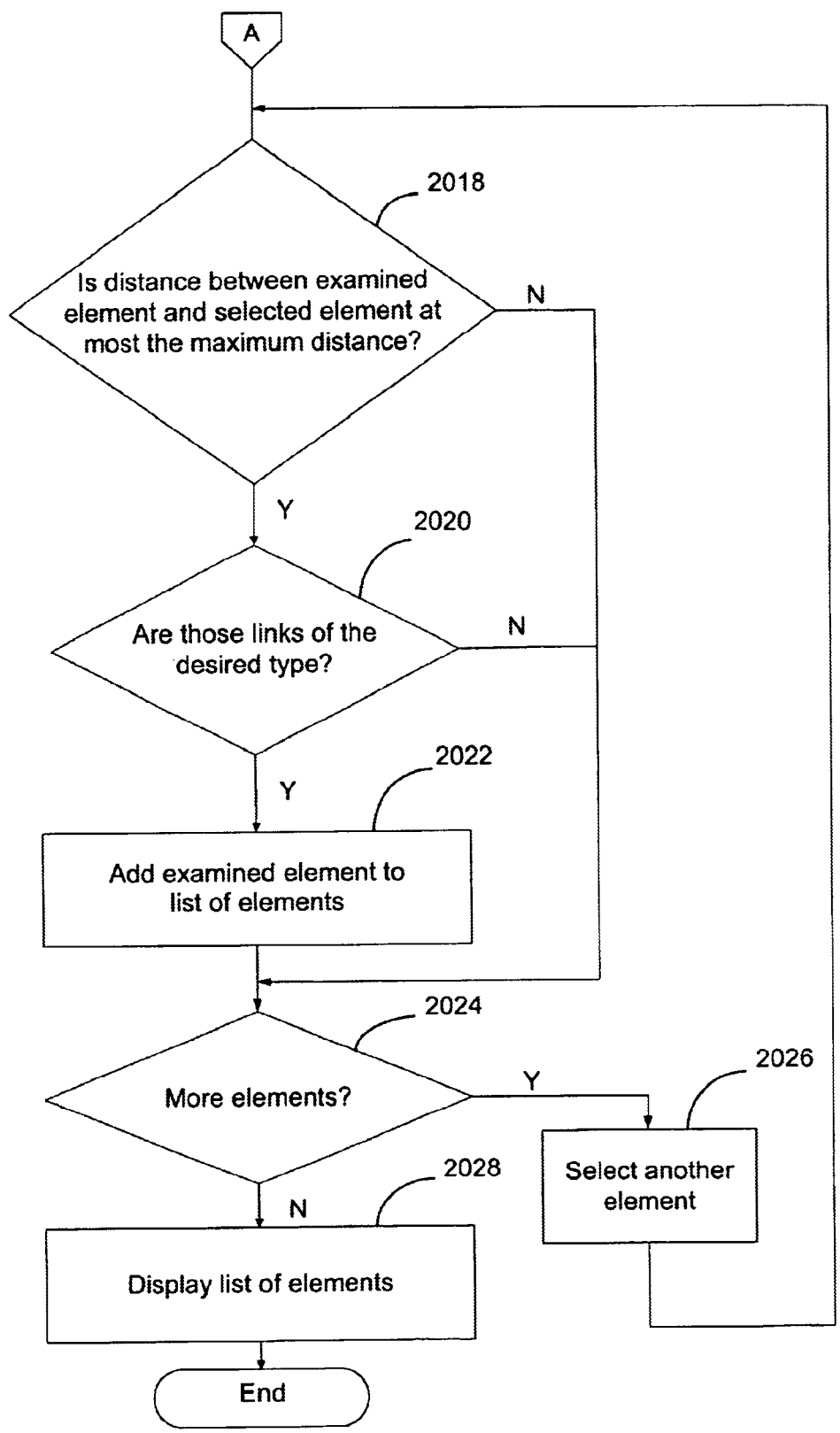
Figure 25:
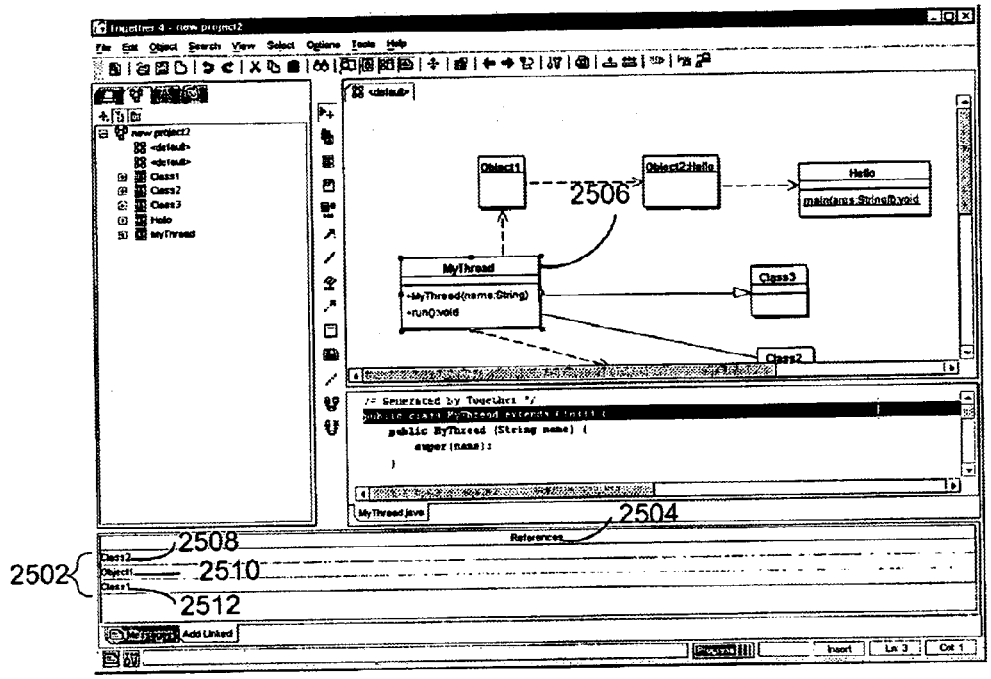
FIG. 25 depicts the user interface displayed after the selection of the options shown in FIG. 24.

Returning to the process depicted in FIGS. 20A and 20B, if there are no more elements for the software development tool to consider (step 2024), the software development tool displays the list of elements (step 2028), and processing ends. As depicted on the screen 2500 in FIG. 25, the elements 2502 that are connected to MyThread 2506 by a maximum of one reference 2504 are Class2 2508, Object1 2510, and Class1 2512.

Figure 26:
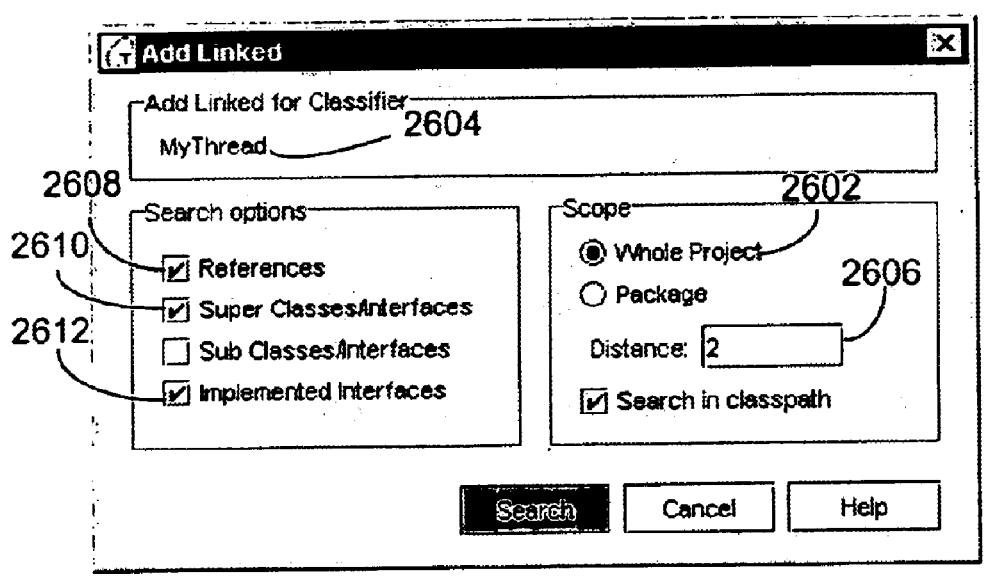
FIG. 26 depicts a second implementation of the feature to find and display linked elements using the software development tool depicted in FIG. 2.
Figure 27:
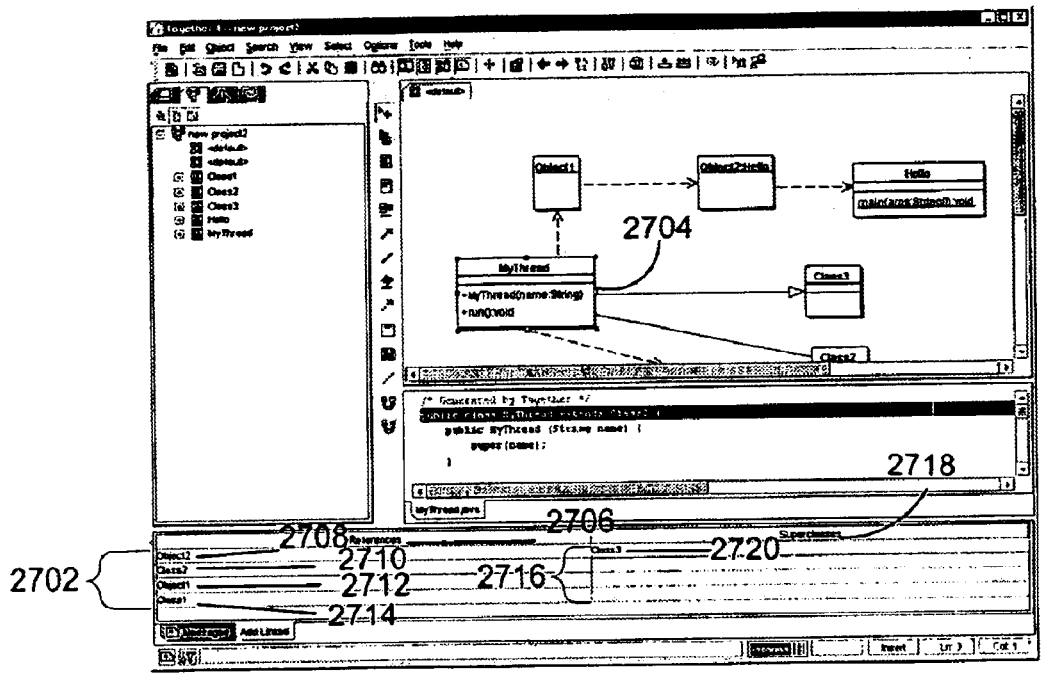
FIG. 27 depicts the user interface displayed after the selection of the options shown in FIG. 26.

In a second example, the developer may search the whole project 2602 for elements that are connected to MyThread 2604 by a maximum of two 2606 references 2608, super classes/interfaces 2610 and/or implemented interfaces 2612, as depicted on the screen 2600 of FIG. 26. As depicted on the screen 2700 in FIG. 27, the elements 2702 that are connected to MyThread 2704 by a maximum of two references 2706 are Object2 2708, Class2 2710, Object1 2712 and Class1 2714. The element 2716 that is connected to MyThread 2704 by a maximum of two super classes 2718 is Class3 2720.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

What is claimed is:

1. A method in a data processing system stored on a computer readable medium and executing on a computer for developing source code having a plurality of elements, the method comprising the steps of: converting the source code into a language-neutral representation; using the language-neutral representation to display a graphical representation of the plurality of elements; receiving a selection of one of the plurality of elements; receiving an indication of a distance; receiving an indication of a type of link; determining from the language-neutral representation which of the plurality of elements is connected to the selected element via a link of the indicated type and within the indicated distance; and displaying the determined elements.

2. The method of claim 1, wherein the selected element comprises a class.

3. The method of claim 1, wherein the determined element comprises a class.

4. The method of claim 1, wherein the selected element comprises an interface.

5. The method of claim 1, wherein the determined element comprises an interface.

6. The method of claim 1, wherein the type comprises a reference.

7. The method of claim 1, wherein the type comprises a super class.

8. The method of claim 1, wherein the type comprises a sub class.

9. The method of claim 1, wherein the type comprises a super interface.

10. The method of claim 1, wherein the type comprises a sub interface.

11. The method of claim 1, wherein the type comprises an implemented interface.

12. The method of claim 1, wherein the type comprises an association.

13. The method of claim 1, wherein the type comprises a dependency.

14. The method of claim 1, wherein the type comprises an aggregation.

15. The method of claim 1, wherein the type comprises a composition.

16. The method of claim 1, wherein the type comprises an inheritance.

17. The method of claim 1, wherein the type comprises an implementation.

18. The method of claim 1, wherein the selected element and the examined element are in a package.

19. A method in a data processing system stored on a computer readable medium and executing on a computer for developing source code having a plurality of elements, the method comprising the steps of: receiving a selection of one of the plurality of elements; receiving an indication of a distance; receiving an indication of a type of link; and determining which of the plurality of elements is connected to the selected element via a link of the indicated type and within the indicated distance.

20. The method of claim 19, further comprising the step of displaying the determined elements.

21. The method of claim 19, wherein the selected element comprises a class.

22. The method of claim 19, wherein the determined element comprises a class.

23. The method of claim 19, wherein the selected element comprises an interface.

24. The method of claim 19, wherein the determined element comprises an interface.

25. The method of claim 19, wherein the type comprises a reference.

26. The method of claim 19, wherein the type comprises a super class.

27. The method of claim 19, wherein the type comprises a sub class.

28. The method of claim 19, wherein the type comprises a super interface.

29. The method of claim 19, wherein the type comprises a sub interface.

30. The method of claim 19, wherein the type comprises an implemented interface.

31. The method of claim 19, wherein the type comprises an association.

32. The method of claim 19, wherein the type comprises a dependency.

33. The method of claim 19, wherein the type comprises an aggregation.

34. The method of claim 19, wherein the type comprises a composition.

35. The method of claim 19, wherein the type comprises an inheritance.

36. The method of claim 19, wherein the type comprises an implementation.

37. The method of claim 19, wherein the selected element and the examined element are in a package.

38. A method in a data processing system stored on a computer readable medium and executing on a computer for developing source code having a plurality of elements, the method comprising the steps of: receiving a selection of one of the plurality of elements; receiving an indication of a distance; and determining which of the plurality of elements is within the indicated distance from the selected element.

39. The method of claim 38, further comprising the step of displaying the determined elements.

40. The method of claim 38, wherein the selected element comprises a class.

41. The method of claim 38, wherein the determined element comprises a class.

42. The method of claim 38, wherein the selected element comprises an interface.

43. The method of claim 38, wherein the determined element comprises an interface.

44. The method of claim 38, wherein the type comprises a reference.

45. The method of claim 38, wherein the type comprises a super class.

46. The method of claim 38, wherein the type comprises a sub class.

47. The method of claim 38, wherein the type comprises a super interface.

48. The method of claim 38, wherein the type comprises a sub interface.

49. The method of claim 38, wherein the type comprises an implemented interface.

50. The method of claim 38, wherein the type comprises an association.

51. The method of claim 38, wherein the type comprises a dependency.

52. The method of claim 38, wherein the type comprises an aggregation.

53. The method of claim 38, wherein the type comprises a composition.

54. The method of claim 38, wherein the type comprises an inheritance.

55. The method of claim 38, wherein the type comprises an implementation.

56. The method of claim 38, wherein the selected element and the examined element are in a package.

57. A method in a data processing system stored on a computer readable medium and executing on a computer for developing source code having a plurality of elements, the method comprising the steps of: receiving a selection of one of the plurality of elements; receiving an indication of a type of link; receiving an indication of a portion of the source code to be searched for said type of link; and determining which of the plurality of elements is connected to the selected element via a link of the indicated type.

58. The method of claim 57, farther comprising the step of displaying the determined elements.

59. The method of claim 57, wherein the selected element comprises a class.

60. The method of claim 57, wherein the determined element comprises a class.

61. The method of claim 57, wherein the selected element comprises an interface.

62. The method of claim 57, wherein the determined element comprises an interface.

63. The method of claim 57, wherein the type comprises a reference.

64. The method of claim 57, wherein the type comprises a super class.

65. The method of claim 57, wherein the type comprises a sub class.

66. The method of claim 57, wherein the type comprises a super interface.

67. The method of claim 57, wherein the type comprises a sub interface.

68. The method of claim 57, wherein the type comprises an implemented interface.

69. The method of claim 57, wherein the type comprises an association.

70. The method of claim 57, wherein the type comprises a dependency.

71. The method of claim 57, wherein the type comprises an aggregation.

72. The method of claim 57, wherein the type comprises a composition.

73. The method of claim 57, wherein the type comprises an inheritance.

74. The method of claim 57, wherein the type comprises an implementation.

75. The method of claim 57, wherein the selected element and the examined element are in a package.

76. A computer-readable medium containing instructions for controlling a data processing system to perform a method, the data processing system having source code comprising a plurality of elements, the method comprising the steps of: converting the source code into a language-neutral representation; using the language-neutral representation to display a graphical representation of the plurality of elements; receiving a selection of one of the plurality of elements; receiving an indication of a distance; receiving an indication of a type of link; determining from the language-neutral representation which of the plurality of elements is connected to the selected element via a link of the indicated type and within the indicated distance; and displaying the determined elements.

77. The computer-readable medium of claim 76, wherein the selected element comprises a class.

78. The computer-readable medium of claim 76, wherein the determined element comprises a class.

79. The computer-readable medium of claim 76, wherein the selected element comprises an interface.

80. The computer-readable medium of claim 76, wherein the determined element comprises an interface.

81. The computer-readable medium of claim 76, wherein the type comprises a reference.

82. The computer-readable medium of claim 76, wherein the type comprises a super class.

83. The computer-readable medium of claim 76, wherein the type comprises a sub class.

84. The computer-readable medium of claim 76, wherein the type comprises a super interface.

85. The computer-readable medium of claim 76, wherein the type comprises a sub interface.

86. The computer-readable medium of claim 76, wherein the type comprises an implemented interface.

87. The computer-readable medium of claim 76, wherein the type comprises an association.

88. The computer-readable medium of claim 76, wherein the type comprises a dependency.

89. The computer-readable medium of claim 76, wherein the type comprises an aggregation.

90. The computer-readable medium of claim 76, wherein the type comprises a composition.

91. The computer-readable medium of claim 76, wherein the type comprises an inheritance.

92. The computer-readable medium of claim 76, wherein the type comprises an implementation.

93. The computer-readable medium of claim 76, wherein the selected element and the examined element are in a package.

94. A computer-readable medium containing instructions for controlling a data processing system to perform a method, the data processing system having source code comprising a plurality of elements, the method comprising the steps of: receiving a selection of one of the plurality of elements; receiving an indication of a distance; receiving an indication of a type of link; and determining which of the plurality of elements is connected to the selected element via a link of the indicated type and within the indicated distance.

95. The computer-readable medium of claim 94, wherein the method further comprises the step of displaying the determined elements.

96. The computer-readable medium of claim 94, wherein the selected element comprises a class.

97. The computer-readable medium of claim 94, wherein the determined element comprises a class.

98. The computer-readable medium of claim 94, wherein the selected element comprises an interface.

99. The computer-readable medium of claim 94, wherein the determined element comprises an interface.

100. The computer-readable medium of claim 94, wherein the type comprises a reference.

101. The computer-readable medium of claim 94, wherein the type comprises a super class.

102. The computer-readable medium of claim 94, wherein the type comprises a sub class.

103. The computer-readable medium of claim 94, wherein the type comprises a super interface.

104. The computer-readable medium of claim 94, wherein the type comprises a sub interface.

105. The computer-readable medium of claim 94, wherein the type comprises an implemented interface.

106. The computer-readable medium of claim 94, wherein the type comprises an association.

107. The computer-readable medium of claim 94, wherein the type comprises a dependency.

108. The computer-readable medium of claim 94, wherein the type comprises an aggregation.

109. The computer-readable medium of claim 94, wherein the type comprises a composition.

110. The computer-readable medium of claim 94, wherein the type comprises an inheritance.

111. The computer-readable medium of claim 94, wherein the type comprises an implementation.

112. The computer-readable medium of claim 94, wherein the selected element and the examined element are in a package.

113. A computer-readable medium containing instructions for controlling a data processing system to perform a method, the data processing system having source code comprising a plurality of elements, the method comprising the steps of: receiving a selection of one of the plurality of elements; receiving an indication of a distance; and determining which of the plurality of elements is within the indicated distance from the selected element.

114. The computer-readable medium of claim 113, wherein the method further comprises the step of displaying the determined elements.

115. The computer-readable medium of claim 113, wherein the selected element comprises a class.

116. The computer-readable medium of claim 113, wherein the determined element comprises a class.

117. The computer-readable medium of claim 113, wherein the selected element comprises an interface.

118. The computer-readable medium of claim 113, wherein the determined element comprises an interface.

119. The computer-readable medium of claim 113, wherein the type comprises a reference.

120. The computer-readable medium of claim 113, wherein the type comprises a super class.

121. The computer-readable medium of claim 113, wherein the type comprises a sub class.

122. The computer-readable medium of claim 113, wherein the type comprises a super interface.

123. The computer-readable medium of claim 113, wherein the type comprises a sub interface.

124. The computer-readable medium of claim 113, wherein the type comprises an implemented interface.

125. The computer-readable medium of claim 113, wherein the type comprises an association.

126. The computer-readable medium of claim 113, wherein the type comprises a dependency.

127. The computer-readable medium of claim 113, wherein the type comprises an aggregation.

128. The computer-readable medium of claim 113, wherein the type comprises a composition.

129. The computer-readable medium of claim 113, wherein the type comprises an inheritance.

130. The computer-readable medium of claim 113, wherein the type comprises an implementation.

131. The computer-readable medium of claim 113, wherein the selected element and the examined element are in a package.

132. A computer-readable medium containing instructions for controlling a data processing system to perform a method, the data processing system having source code comprising a plurality of elements, the method comprising the steps of: receiving a selection of one of the plurality of elements; receiving an indication of a type of link; receiving an indication of a portion of the source code; to be searched for said type of link; and determining which of the plurality of elements is connected to the selected element via a link of the indicated type.

133. The computer-readable medium of claim 132, wherein the method further comprises the step of displaying the determined elements.

134. The computer-readable medium of claim 132, wherein the selected element comprises a class.

135. The computer-readable medium of claim 132, wherein the determined element comprises a class.

136. The computer-readable medium of claim 132, wherein the selected element comprises an interface.

137. The computer-readable medium of claim 132, wherein the determined element comprises an interface.

138. The computer-readable medium of claim 132, wherein the type comprises a reference.

139. The computer-readable medium of claim 132, wherein the type comprises a super class.

140. The computer-readable medium of claim 132, wherein the type comprises a sub class.

141. The computer-readable medium of claim 132, wherein the type comprises a super interface.

142. The computer-readable medium of claim 132, wherein the type comprises a sub interface.

143. The computer-readable medium of claim 132, wherein the type comprises an implemented interface.

144. The computer-readable medium of claim 132, wherein the type comprises an association.

145. The computer-readable medium of claim 132, wherein the type comprises a dependency.

146. The computer-readable medium of claim 132, wherein the type comprises an aggregation.

147. The computer-readable medium of claim 132, wherein the type comprises a composition.

148. The computer-readable medium of claim 132, wherein the type comprises an inheritance.

149. The computer-readable medium of claim 132, wherein the type comprises an implementation.

150. The computer-readable medium of claim 132, wherein the selected element and the examined element are in a package.

151. A data processing system executing on a computer comprising: a secondary storage device further comprising source code having a plurality of elements; a memory device further comprising a program that receives a selection of one of the plurality of elements, that receives an indication of a distance, that receives an indication of a type of link, and that determines which of the plurality of elements is connected to the selected element via a link of the indicated type and within the indicated distance; and a processor for running the program.

152. The data processing system of claim 151, wherein the program further displays the determined elements.

153. The data processing system of claim 151, wherein the selected element comprises a class.

154. The data processing system of claim 151, wherein the determined element comprises a class.

155. The data processing system of claim 151, wherein the selected element comprises an interface.

156. The data processing system of claim 151, wherein the determined element comprises an interface.

157. The data processing system of claim 151, wherein the type comprises a reference.

158. The data processing system of claim 151, wherein the type comprises a super class.

159. The data processing system of claim 151, wherein the type comprises a sub class.

160. The data processing system of claim 151, wherein the type comprises a super interface.

161. The data processing system of claim 151, wherein the type comprises a sub interface.

162. The data processing system of claim 151, wherein the type comprises an implemented interface.

163. The data processing system of claim 151, wherein the type comprises an association.

164. The data processing system of claim 151, wherein the type comprises a dependency.

165. The data processing system of claim 151, wherein the type comprises an aggregation.

166. The data processing system of claim 151, wherein the type comprises a composition.

167. The data processing system of claim 151, wherein the type comprises an inheritance.

168. The data processing system of claim 151, wherein the type comprises an implementation.

169. The data processing system of claim 151, wherein the selected element and the examined element are in a package.

170. A system for developing source code stored on a computer readable medium and executing on a computer having a plurality of elements, the system comprising: means for receiving a selection of one of the plurality of elements; means for receiving an indication of a type of link; means for receiving an indication of a portion of the source code to be searched for said type of link; and means for determining which of the plurality of elements is connected to the selected element via a link of the indicated type.

* * * * *